US012683872B2

(12) United States Patent
Zhang et al.

(10) Patent No.: US 12,683,872 B2
(45) Date of Patent: Jul. 14, 2026

(54) RADIO ACCESS NETWORK NODE REGISTRATION AND DISCOVERY

(71) Applicant: QUALCOMM Incorporated, San Diego, CA (US)

(72) Inventors: Juan Zhang, Beijing (CN); Gavin Bernard Horn, La Jolla, CA (US); Xipeng Zhu, San Diego, CA (US); Shankar Krishnan, San Diego, CA (US); Rajeev Kumar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/291,889

(22) PCT Filed: Sep. 16, 2021

(86) PCT No.: PCT/CN2021/118693
§ 371 (c)(1),
(2) Date: Jan. 24, 2024

(87) PCT Pub. No.: WO2023/039788
PCT Pub. Date: Mar. 23, 2023

(65) Prior Publication Data
US 2024/0380678 A1 Nov. 14, 2024

(51) Int. Cl.
*H04L 41/34* (2022.01)
*H04L 41/0853* (2022.01)
(Continued)

(52) U.S. Cl.
CPC .......... *H04L 41/34* (2022.05); *H04L 41/0856* (2013.01); *H04L 41/14* (2013.01); *H04L 41/5051* (2013.01)

(58) Field of Classification Search
CPC . H04L 41/34; H04L 41/0856; H04L 41/5051; H04L 41/14
See application file for complete search history.

(56) References Cited

U.S. PATENT DOCUMENTS

2019/0306026 A1 10/2019 Dippenaar et al.
2020/0328953 A1 10/2020 Taft et al.
(Continued)

FOREIGN PATENT DOCUMENTS

WO WO-2020000370 A1 1/2020
WO WO-2020034371 A1 2/2020
(Continued)

OTHER PUBLICATIONS

International Search Report and Written Opinion—PCT/CN2021/118693—ISA/EPO—May 11, 2022.
(Continued)

*Primary Examiner* — Tonia L Dollinger
*Assistant Examiner* — Joseph M Cousins
(74) *Attorney, Agent, or Firm* — Holland & Hart LLP

(57) ABSTRACT

Methods, systems, and devices for wireless communications are described. An access and mobility management function (AMF) may register a configuration of one or more RAN entities to a network repository function (NRF). The AMF may register information associated with a device with a UDM. A network data analytics function (NWDAF) may perform RAN discovery via the NRF, the UDM, or both. The NWDAF may receive an analytics request from a device, and the NWDAF may query the NRF, the UDM, or both for information about one or more targets of the analytics request, and the NWDAF may receive such information from the NRF, the UDM, or both. The NWDAF may transmit a data collection request to the RAN and the NWDAF may receive data back from the RAN.

30 Claims, 26 Drawing Sheets

(51) Int. Cl.
    H04L 41/14          (2022.01)
    H04L 41/5051     (2022.01)

(56)           References Cited

U.S. PATENT DOCUMENTS

2023/0254680 A1*   8/2023   Fu ........................... H04W 8/18
                                                      370/331
2024/0236732 A1*   7/2024   Zhang .................... H04L 41/14

FOREIGN PATENT DOCUMENTS

WO     WO-2021032498 A1     2/2021
WO     WO-2021044204 A1     3/2021

OTHER PUBLICATIONS

Partial International Search Report—PCT/CN2021/118693—ISA/
EPO—Mar. 11, 2022.

* cited by examiner

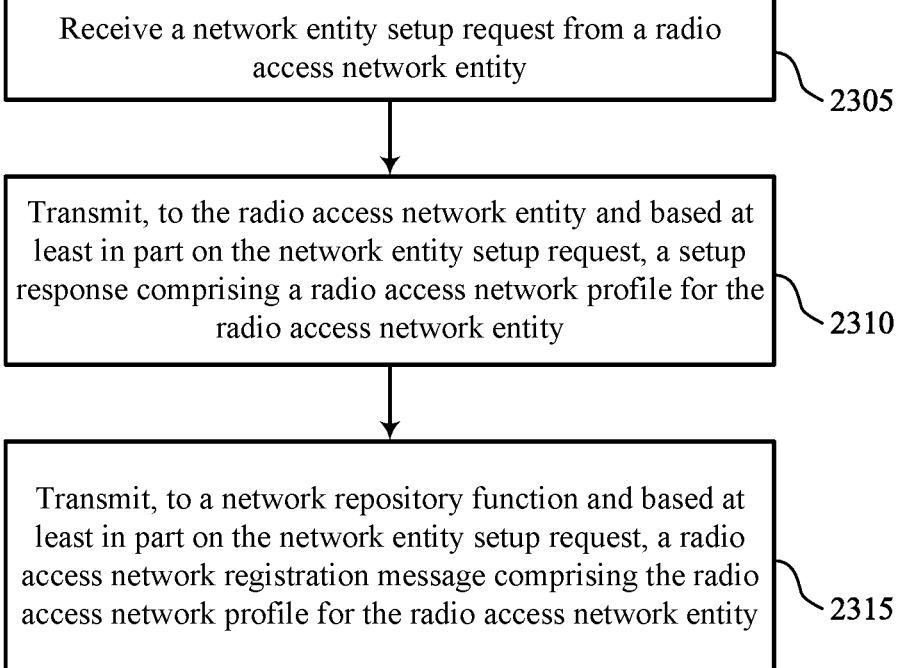

Receive a network entity setup request from a radio access network entity

2305

Transmit, to the radio access network entity and based at least in part on the network entity setup request, a setup response comprising a radio access network profile for the radio access network entity

2310

Transmit, to a network repository function and based at least in part on the network entity setup request, a radio access network registration message comprising the radio access network profile for the radio access network entity

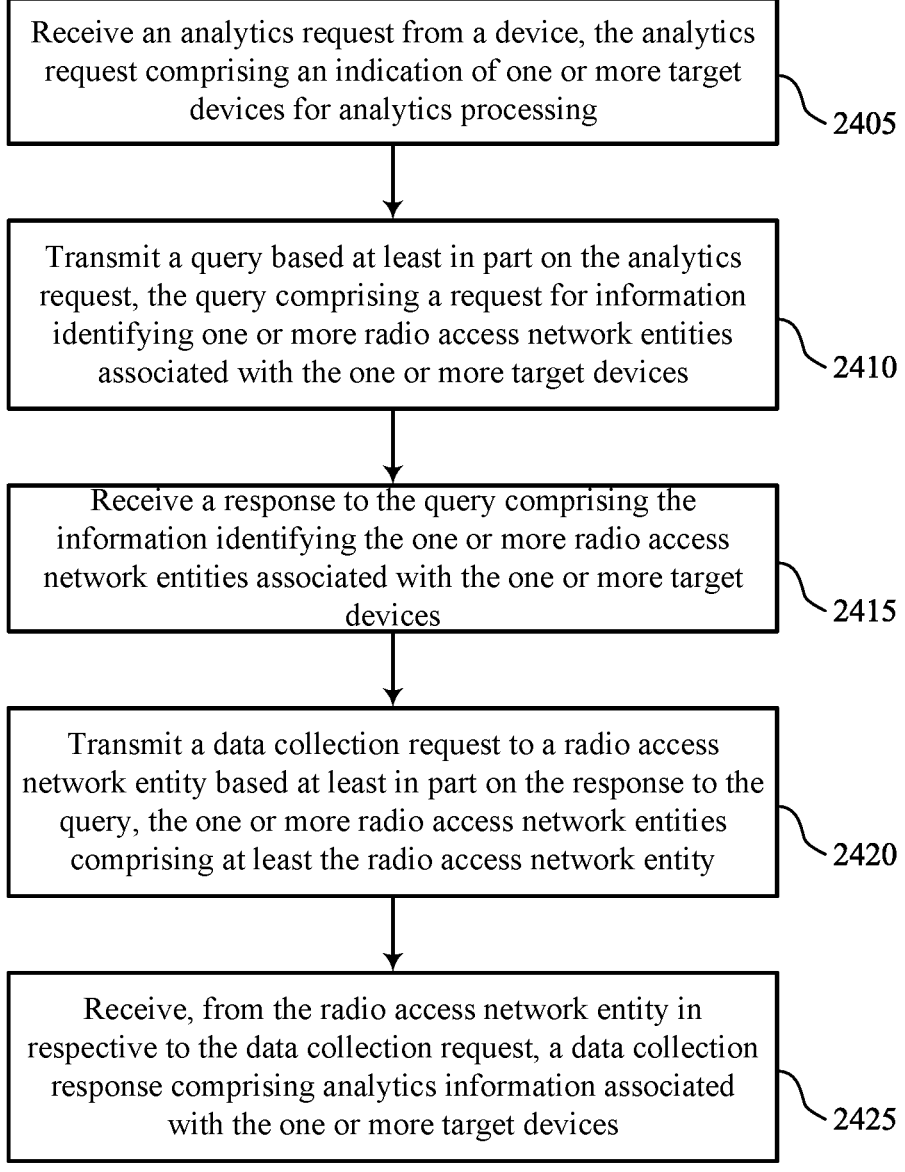

Receive an analytics request from a device, the analytics request comprising an indication of one or more target devices for analytics processing

2405

Transmit a query based at least in part on the analytics request, the query comprising a request for information identifying one or more radio access network entities associated with the one or more target devices

2410

Receive a response to the query comprising the information identifying the one or more radio access network entities associated with the one or more target devices

2415

Transmit a data collection request to a radio access network entity based at least in part on the response to the query, the one or more radio access network entities comprising at least the radio access network entity

2420

Receive, from the radio access network entity in respective to the data collection request, a data collection response comprising analytics information associated with the one or more target devices

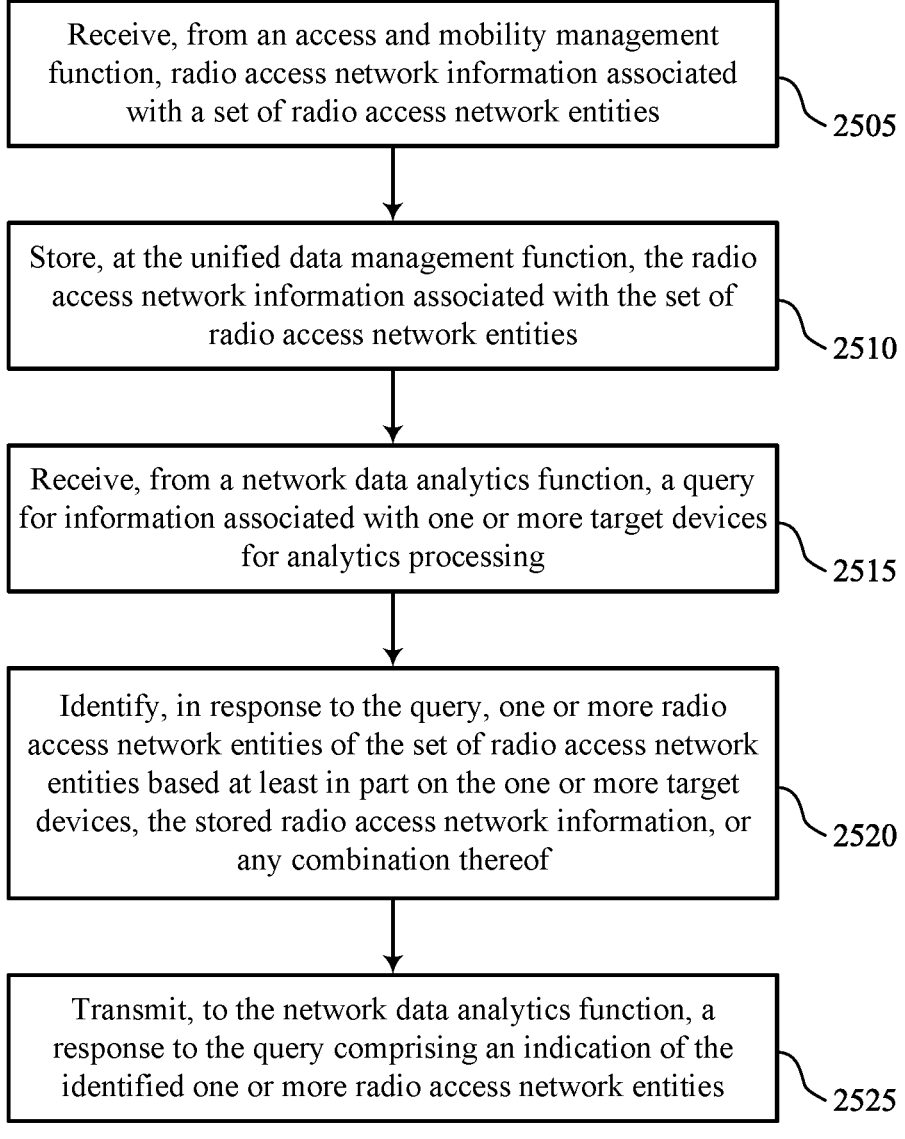

Receive, from an access and mobility management function, radio access network information associated with a set of radio access network entities

2505

Store, at the unified data management function, the radio access network information associated with the set of radio access network entities

2510

Receive, from a network data analytics function, a query for information associated with one or more target devices for analytics processing

2515

Identify, in response to the query, one or more radio access network entities of the set of radio access network entities based at least in part on the one or more target devices, the stored radio access network information, or any combination thereof

2520

Transmit, to the network data analytics function, a response to the query comprising an indication of the identified one or more radio access network entities

RADIO ACCESS NETWORK NODE REGISTRATION AND DISCOVERY

CROSS REFERENCE

The present Application is a 371 national stage filing of International PCT Application No. PCT/CN2021/118693 by ZHANG et al. entitled "RADIO ACCESS NETWORK NODE REGISTRATION AND DISCOVERY," filed Sep. 16, 2021, which is assigned to the assignee hereof, and which is expressly incorporated by reference in its entirety herein.

FIELD OF TECHNOLOGY

The following relates to for wireless communications, including radio access network node registration and discovery.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications system, a wireless device may perform analytics collection, analysis, or both. However, prior methods for such analytics collection schemes may be deficient.

SUMMARY

The described techniques relate to improved methods, systems, devices, and apparatuses that support radio access network (RAN) node registration and discovery. Generally, the described techniques provide for procedures, rules, or schemes for registering RAN nodes and for retrieving information about one or more of those nodes (e.g., in response to subsequent requests or queries). Such procedures, rules, or schemes may include the use of various elements, including one or more devices associated with the RAN, an access and mobility management function (AMF), a network data analytics function (NWDAF), a unified data management function (UDM), a network repository function (NRF), or any combination thereof. The AMF may receive (e.g., from a device associated with the RAN) information about one or more devices to be registered, and the AMF may register the one or more devices with the NRF. The AMF may also transmit RAN entity information to the UDM. The AMF may further receive an update request, and may update one or more RAN profiles at the NRF. The NWDAF may receive an analytics request (e.g., from a device associated with the RAN), and may transmit a query to the NRF, the UDM, or both, to receive information that may identify one or more RAN entities that may be the targets or subject of the analytics request. The NWDAF may (e.g., based on the received information identifying one or more RAN nodes) transmit one or more data collection requests (e.g., to the one or more RAN nodes) and may receive one or more responses to the data collection requests.

A method for wireless communications at an access and mobility management function is described. The method may include receiving a network entity setup request from a radio access network entity, transmitting, to the radio access network entity and based on the network entity setup request, a setup response including a radio access network profile for the radio access network entity, and transmitting, to a network repository function and based on the network entity setup request, a radio access network registration message including the radio access network profile for the radio access network entity.

An apparatus for wireless communications at an access and mobility management function is described. The apparatus may include a processor, memory coupled with the processor, and instructions stored in the memory. The instructions may be executable by the processor to cause the apparatus to receive a network entity setup request from a radio access network entity, transmit, to the radio access network entity and based on the network entity setup request, a setup response including a radio access network profile for the radio access network entity, and transmit, to a network repository function and based on the network entity setup request, a radio access network registration message including the radio access network profile for the radio access network entity.

Another apparatus for wireless communications at an access and mobility management function is described. The apparatus may include means for receiving a network entity setup request from a radio access network entity, means for transmitting, to the radio access network entity and based on the network entity setup request, a setup response including a radio access network profile for the radio access network entity, and means for transmitting, to a network repository function and based on the network entity setup request, a radio access network registration message including the radio access network profile for the radio access network entity.

A non-transitory computer-readable medium storing code for wireless communications at an access and mobility management function is described. The code may include instructions executable by a processor to receive a network entity setup request from a radio access network entity, transmit, to the radio access network entity and based on the network entity setup request, a setup response including a radio access network profile for the radio access network entity, and transmit, to a network repository function and based on the network entity setup request, a radio access network registration message including the radio access network profile for the radio access network entity.

Some examples of the method, apparatuses, and non-transitory computer-readable medium described herein may further include operations, features, means, or instructions for transmitting, to a unified data management function and based on the network entity setup request, radio access network entity information associated with the radio access network entity.

In some examples of the method, apparatuses, and non-transitory computer-readable medium described herein, the radio access network entity information includes a radio access network entity identifier for the radio access network entity, a radio access network entity name for the radio access network entity, or both.

Some examples of the method, apparatuses, and non-transitory computer-readable medium described herein may further include operations, features, means, or instructions for receiving, from the radio access network entity, a request to update the radio access network profile for the radio access network entity, transmitting, to the network repository function, an updated radio access network profile for the radio access network entity, and receiving a confirmation message from the network repository function indicating that that the updated radio access network profile for the radio access network entity may have been registered at the network repository function.

In some examples of the method, apparatuses, and non-transitory computer-readable medium described herein, the updated radio access network profile includes an updated radio access network entity identifier for the radio access network entity, an updated radio access network entity name for the radio access network entity, or both.

In some examples of the method, apparatuses, and non-transitory computer-readable medium described herein, the radio access network profile includes a radio access network entity identifier for the radio access network entity, a radio access network entity name for the radio access network entity, one or more registration areas supported by the radio access network entity, registration area code slice information for the radio access network entity, or any combination thereof.

Some examples of the method, apparatuses, and non-transitory computer-readable medium described herein may further include operations, features, means, or instructions for receiving a confirmation message from the network repository function indicating that the radio access network profile for the radio access network entity may have been registered at the network repository function.

A method for wireless communications at a network data analytics function is described. The method may include receiving an analytics request from a device, the analytics request including an indication of one or more target devices for analytics processing, transmitting a query based on the analytics request, the query including a request for information identifying one or more radio access network entities associated with the one or more target devices, receiving a response to the query including the information identifying the one or more radio access network entities associated with the one or more target devices, transmitting a data collection request to a radio access network entity based on the response to the query, the one or more radio access network entities including at least the radio access network entity, and receiving, from the radio access network entity in respective to the data collection request, a data collection response including analytics information associated with the one or more target devices.

An apparatus for wireless communications at a network data analytics function is described. The apparatus may include a processor, memory coupled with the processor, and instructions stored in the memory. The instructions may be executable by the processor to cause the apparatus to receive an analytics request from a device, the analytics request including an indication of one or more target devices for analytics processing, transmit a query based on the analytics request, the query including a request for information identifying one or more radio access network entities associated with the one or more target devices, receive a response to the query including the information identifying the one or more radio access network entities associated with the one or more target devices, transmit a data collection request to a radio access network entity based on the response to the query, the one or more radio access network entities including at least the radio access network entity, and receive, from the radio access network entity in respective to the data collection request, a data collection response including analytics information associated with the one or more target devices.

Another apparatus for wireless communications at a network data analytics function is described. The apparatus may include means for receiving an analytics request from a device, the analytics request including an indication of one or more target devices for analytics processing, means for transmitting a query based on the analytics request, the query including a request for information identifying one or more radio access network entities associated with the one or more target devices, means for receiving a response to the query including the information identifying the one or more radio access network entities associated with the one or more target devices, means for transmitting a data collection request to a radio access network entity based on the response to the query, the one or more radio access network entities including at least the radio access network entity, and means for receiving, from the radio access network entity in respective to the data collection request, a data collection response including analytics information associated with the one or more target devices.

A non-transitory computer-readable medium storing code for wireless communications at a network data analytics function is described. The code may include instructions executable by a processor to receive an analytics request from a device, the analytics request including an indication of one or more target devices for analytics processing, transmit a query based on the analytics request, the query including a request for information identifying one or more radio access network entities associated with the one or more target devices, receive a response to the query including the information identifying the one or more radio access network entities associated with the one or more target devices, transmit a data collection request to a radio access network entity based on the response to the query, the one or more radio access network entities including at least the radio access network entity, and receive, from the radio access network entity in respective to the data collection request, a data collection response including analytics information associated with the one or more target devices.

Some examples of the method, apparatuses, and non-transitory computer-readable medium described herein may further include operations, features, means, or instructions for transmitting the query includes transmitting the query to a network repository function.

In some examples of the method, apparatuses, and non-transitory computer-readable medium described herein, the indication of one or more target devices includes an indication of one or more registration areas, an indication of one or more network slices, or both and the request for information associated with the one or more target devices includes a request for information associated with the one or more registration areas, the one or more network slices, or both.

Some examples of the method, apparatuses, and non-transitory computer-readable medium described herein may further include operations, features, means, or instructions for transmitting the query includes transmitting the query to a unified data management function.

In some examples of the method, apparatuses, and non-transitory computer-readable medium described herein, the indication of one or more target devices includes an indication of one or more network subscription identifiers, one or more identifiers for one or more groups of target devices, one or more user equipments (UEs), or any combination thereof and the request for information associated with the one or more target devices includes a request for information associated with the one or more network subscription identifiers, the one or more identifiers for the one or more groups of target devices, the one or more user equipment (UE) s, or any combination thereof.

In some examples of the method, apparatuses, and non-transitory computer-readable medium described herein, the information identifying the one or more radio access network entities includes information identifying a radio access network entity that may be associated with one of the one or more UEs.

In some examples of the method, apparatuses, and non-transitory computer-readable medium described herein, the information identifying the one or more radio access network entities includes a list of one or more radio access network entity identifiers.

In some examples of the method, apparatuses, and non-transitory computer-readable medium described herein, the device includes an access and mobility management function, a service management function, a policy control function, a second radio access network entity, a core network entity, an application function, an operations, administration and maintenance function, or any combination thereof.

Some examples of the method, apparatuses, and non-transitory computer-readable medium described herein may further include operations, features, means, or instructions for transmitting, to the device and in response to receiving the analytics request, an analytics response including the analytics information associated with the one or more target devices.

Some examples of the method, apparatuses, and non-transitory computer-readable medium described herein may further include operations, features, means, or instructions for determining one or more analytics results based on the analytics information, where the analytics response further includes the one or more analytics results.

A method for wireless communications at a unified data management function is described. The method may include receiving, from an access and mobility management function, radio access network information associated with a set of radio access network entities, storing, at the unified data management function, the radio access network information associated with the set of radio access network entities, receiving, from a network data analytics function, a query for information associated with one or more target devices for analytics processing, identifying, in response to the query, one or more radio access network entities of the set of radio access network entities based on the one or more target devices, the stored radio access network information, or any combination thereof, and transmitting, to the network data analytics function, a response to the query including an indication of the identified one or more radio access network entities.

An apparatus for wireless communications at a unified data management function is described. The apparatus may include a processor, memory coupled with the processor, and instructions stored in the memory. The instructions may be executable by the processor to cause the apparatus to receive, from an access and mobility management function, radio access network information associated with a set of radio access network entities, store, at the unified data management function, the radio access network information associated with the set of radio access network entities, receive, from a network data analytics function, a query for information associated with one or more target devices for analytics processing, identify, in response to the query, one or more radio access network entities of the set of radio access network entities based on the one or more target devices, the stored radio access network information, or any combination thereof, and transmit, to the network data analytics function, a response to the query including an indication of the identified one or more radio access network entities.

Another apparatus for wireless communications at a unified data management function is described. The apparatus may include means for receiving, from an access and mobility management function, radio access network information associated with a set of radio access network entities, means for storing, at the unified data management function, the radio access network information associated with the set of radio access network entities, means for receiving, from a network data analytics function, a query for information associated with one or more target devices for analytics processing, means for identifying, in response to the query, one or more radio access network entities of the set of radio access network entities based on the one or more target devices, the stored radio access network information, or any combination thereof, and means for transmitting, to the network data analytics function, a response to the query including an indication of the identified one or more radio access network entities.

A non-transitory computer-readable medium storing code for wireless communications at a unified data management function is described. The code may include instructions executable by a processor to receive, from an access and mobility management function, radio access network information associated with a set of radio access network entities, store, at the unified data management function, the radio access network information associated with the set of radio access network entities, receive, from a network data analytics function, a query for information associated with one or more target devices for analytics processing, identify, in response to the query, one or more radio access network entities of the set of radio access network entities based on the one or more target devices, the stored radio access network information, or any combination thereof, and transmit, to the network data analytics function, a response to the query including an indication of the identified one or more radio access network entities.

In some examples of the method, apparatuses, and non-transitory computer-readable medium described herein, the radio access network information includes a radio access network entity identifier, a radio access network entity name, or both.

In some examples of the method, apparatuses, and non-transitory computer-readable medium described herein, the radio access network information may be received as part of a registration area update procedure.

In some examples of the method, apparatuses, and non-transitory computer-readable medium described herein, the query further includes a request for information associated with one or more network subscription identifiers, one or more identifiers for one or more groups of target devices, one or more user equipments (UEs) or any combination thereof and identifying the one or more radio access network entities of the set of radio access network entities may be based on the one or more network subscription identifiers, the one or more identifiers for the one or more groups of target devices, the one or more UEs, or any combination thereof.

In some examples of the method, apparatuses, and non-transitory computer-readable medium described herein, the indication of the identified one or more radio access network entities includes a radio access network entity identifier associated with a radio access network entity that may be associated with one of the one or more UEs.

In some examples of the method, apparatuses, and non-transitory computer-readable medium described herein, the indication of the identified one or more radio access network entities includes a list of one or more radio access network entity identifiers.

A method for wireless communications at a network repository function is described. The method may include receiving, from an access and mobility management function, a set of radio access network profiles for a set of radio access network entities, registering the set of radio access network profiles at the network repository function, receiving, from a network data analytics function, a query for information identifying one or more radio access network entities associated with one or more target devices for analytics processing, identifying, in response to the query, one or more radio access network entities of the set of radio access network entities based on the one or more target devices, the set of radio access network profiles, or any combination thereof, and transmitting, to the network data analytics function, a response to the query including an indication of the identified one or more radio access network entities.

An apparatus for wireless communications at a network repository function is described. The apparatus may include a processor, memory coupled with the processor, and instructions stored in the memory. The instructions may be executable by the processor to cause the apparatus to receive, from an access and mobility management function, a set of radio access network profiles for a set of radio access network entities, register the set of radio access network profiles at the network repository function, receive, from a network data analytics function, a query for information identifying one or more radio access network entities associated with one or more target devices for analytics processing, identify, in response to the query, one or more radio access network entities of the set of radio access network entities based on the one or more target devices, the set of radio access network profiles, or any combination thereof, and transmit, to the network data analytics function, a response to the query including an indication of the identified one or more radio access network entities.

Another apparatus for wireless communications at a network repository function is described. The apparatus may include means for receiving, from an access and mobility management function, a set of radio access network profiles for a set of radio access network entities, means for registering the set of radio access network profiles at the network repository function, means for receiving, from a network data analytics function, a query for information identifying one or more radio access network entities associated with one or more target devices for analytics processing, means for identifying, in response to the query, one or more radio access network entities of the set of radio access network entities based on the one or more target devices, the set of radio access network profiles, or any combination thereof, and means for transmitting, to the network data analytics function, a response to the query including an indication of the identified one or more radio access network entities.

A non-transitory computer-readable medium storing code for wireless communications at a network repository function is described. The code may include instructions executable by a processor to receive, from an access and mobility management function, a set of radio access network profiles for a set of radio access network entities, register the set of radio access network profiles at the network repository function, receive, from a network data analytics function, a query for information identifying one or more radio access network entities associated with one or more target devices for analytics processing, identify, in response to the query, one or more radio access network entities of the set of radio access network entities based on the one or more target devices, the set of radio access network profiles, or any combination thereof, and transmit, to the network data analytics function, a response to the query including an indication of the identified one or more radio access network entities.

Some examples of the method, apparatuses, and non-transitory computer-readable medium described herein may further include operations, features, means, or instructions for receiving an updated radio access network profile including an update flag, updating a radio access network profile of the set of radio access network profiles based on the updated radio access network profile, and transmitting a confirmation message indicating that the radio access network profile of the set of radio access network profiles may have been updated.

In some examples of the method, apparatuses, and non-transitory computer-readable medium described herein, the updated radio access network profile includes a radio access network entity identifier, a radio access network entity name, or both.

In some examples of the method, apparatuses, and non-transitory computer-readable medium described herein, each radio access network profile of the set of radio access network profiles includes a radio access network entity identifier, a radio access network entity name, one or more supported registration areas, network slicing information, or any combination thereof.

Some examples of the method, apparatuses, and non-transitory computer-readable medium described herein may further include operations, features, means, or instructions for transmitting, to the access and mobility management function, a confirmation message indicating that the set of radio access network profiles may have been registered at the network repository function.

In some examples of the method, apparatuses, and non-transitory computer-readable medium described herein, the query further includes a request for information associated with one or more registration areas, one or more network slices, or both and identifying the one or more radio access network entities may be based on the one or more registration areas, the one or more network slices, or both.

In some examples of the method, apparatuses, and non-transitory computer-readable medium described herein, the indication of the identified one or more radio access network entities includes a list of one or more radio access network entity identifiers.

BRIEF DESCRIPTION OF THE DRAWINGS

FIGS. 23 through 26 show flowcharts illustrating methods that support RAN node registration and discovery in accordance with aspects of the present disclosure.

DETAILED DESCRIPTION

Figure 1:
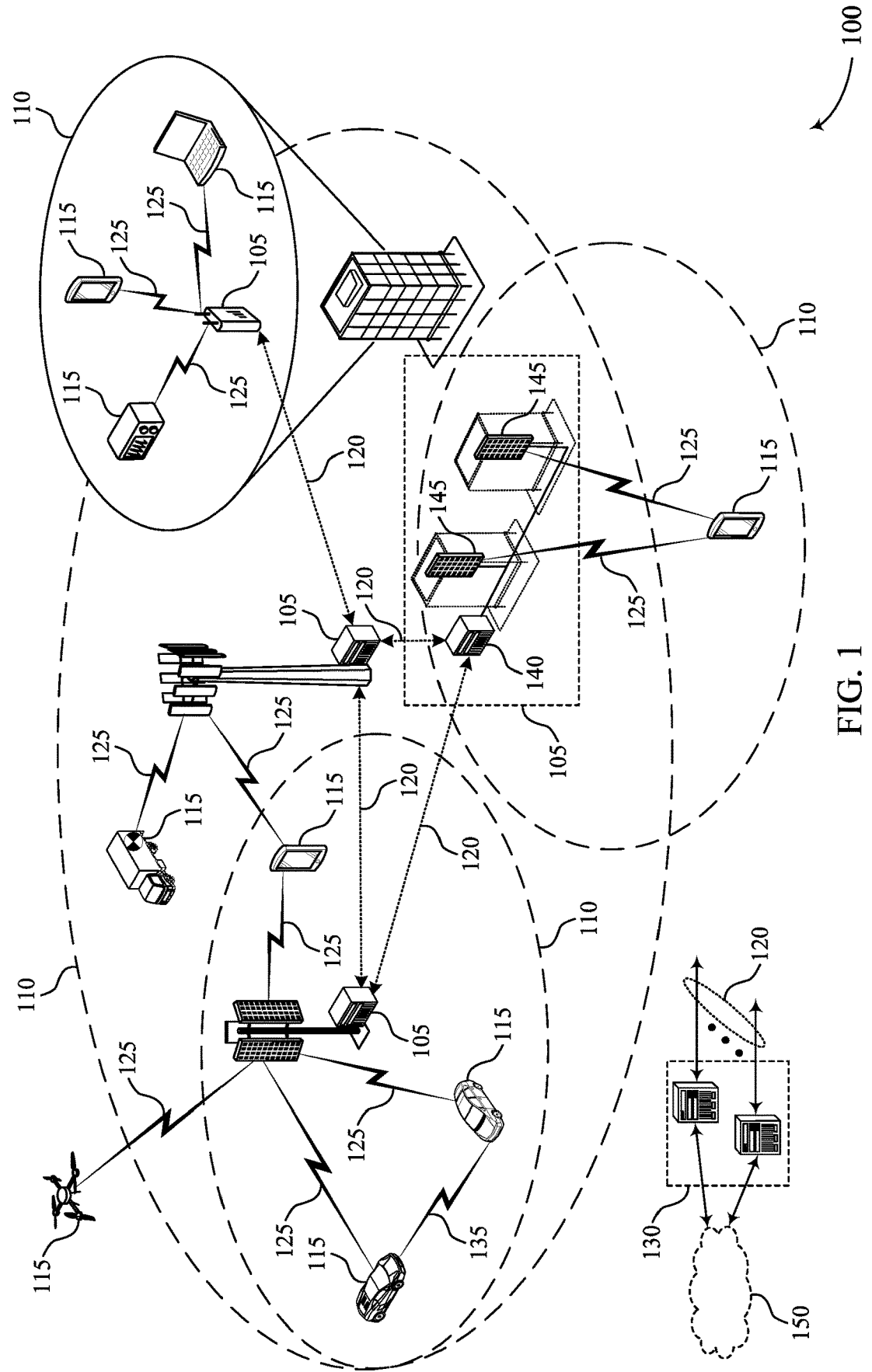
FIG. 1 illustrates an example of a wireless communications system that supports radio access network (RAN) node registration and discovery in accordance with aspects of the present disclosure.

In wireless communications, a network may contain or be associated with large amounts of data (e.g., records of communications, actions, procedures, or operations performed in the course of operation of the network, records of performance statistics or related measurements). Such data may be collected, stored, organized, and analyzed to determine patterns, features, or other information that may be useful (e.g., for optimization or adjustment of the network's configuration). In some examples, artificial intelligence (AI), machine learning (ML), or both may be employed for such data collection, storage, organization, analysis, or other processing. For instance, AI or ML may be used in a coordinated matter between various network groups or elements (e.g., between a radio access network (RAN) and a core network (CN)). In some examples, a network data analytics function (NWDAF) may be used, which may be a network entity that interfaces with one or more RAN entities or entities associated with the RAN, which may be referred to as RAN nodes, as well as with one or more data repositories or related functions, such as a unified data management function (UDM), a network repository function (NRF) or both. For example, the NWDAF may collect data from the RAN directly as part of the analytics collection and analysis procedures. Additionally or alternatively, the NWDAF may transmit data to and receive data from the UDM or NRF.

In some cases, the NWDAF may receive an analytics request (e.g., from one or more user equipments (UEs), from a CN entity, or from a RAN entity), and data responsive to the analytics request may be associated with one or more RAN entities (e.g., one or more base stations). Systems, devices, and techniques as described herein may support the NWDAF identifying the one or more RAN entities associated with such responsive data, which may support obtaining the responsive data from those one or more RAN entities. For example, once the NWDAF has identified the one or more RAN entities associated with the data responsive to the analytics request, the NWDAF may query those one or more RAN entities to obtain the responsive data, and the NWDAF may then provide the responsive data to the one or more entities that issued the analytics request. For example, as described herein, information related to RAN entities may be stored to the UDM, NRF, or both (e.g., as part of various registration or update procedures) to support subsequent querying of the UDM, NRF, or both by the NWDAF in response to an analytics request received by the NWDAF, so that the NWDAF may identify one or more RAN entities associated with data responsive to the analytics request. Such querying by the NWDAF to identify one or more RAN entities associated with data responsive to an analytics request may be referred o as RAN discovery.

In some examples, the RAN may register a configuration of one or more RAN entities to the AMF, and the AMF may transmit a response to the RAN. As used herein, the RAN may refer to any collection of one or more RAN entities (e.g., base stations) within a wireless communications network. The AMF may register such a configuration to the NRF, and the NRF may respond in turn to the AMF (e.g., may provide a confirmation response). Also, in some examples, the AMF may register information associated with a device (e.g., a user equipment (UE)) to be stored in the UDM. The UDM may respond in turn to the AMF (e.g., may provide a confirmation response).

In some examples, the NWDAF may perform RAN discovery via the NRF. The NWDAF may receive an analytics request from a device, and the NWDAF may query the NRF for information about one or more targets of the analytics request, and the NWDAF may receive such information from the NRF. The NWDAF may transmit a data collection request to the RAN (e.g., to one or more identified targets or devices associated with the RAN), and the NWDAF may receive data back from the RAN. Additionally or alternatively, the NWDAF may perform RAN discovery via the UDM. The NWDAF may receive an analytics request from a device, and the NWDAF may query the UDM for information about one or more targets of the analytics request, and the NWDAF may receive such information from the UDM. The NWDAF may transmit a data collection request to the RAN (e.g., to one or more identified targets or devices associated with the RAN), and the NWDAF may receive data back from the RAN.

Aspects of the disclosure are initially described in the context of wireless communications systems. Aspects of the disclosure are then described in the context of an example system and various process flows. Aspects of the disclosure are further illustrated by and described with reference to apparatus diagrams, system diagrams, and flowcharts that relate to RAN node registration and discovery.

FIG. 1 illustrates an example of a wireless communications system 100 that supports RAN node registration and discovery in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

To define or improve upon procedures for RAN node registration and discovery, various network entities (e.g., one or more entities associated with the core network 130, one or more RAN nodes, such as UEs 115, base stations 105, or other RAN nodes) may work in a coordinated fashion to register and discover one or more RAN nodes, and may collect, store, organize, analyze, or process (or any combination thereof) information associated with the one or more RAN nodes to provide analytics information about or associated with the network. The AMF may register a configuration of one or more RAN entities to the NRF. The AMF may register information associated with a device with a UDM. A network data analytics function (NWDAF) may perform RAN discovery via the NRF, the UDM, or both. The NWDAF may receive an analytics request from a device, and the NWDAF may query the NRF, the UDM, or both for information about one or more targets of the analytics request, and the NWDAF may receive such information from the NRF, the UDM, or both. The NWDAF may transmit a data collection request to the RAN and the NWDAF may receive data back from the RAN. The NWDAF may analyze such information, or may determine or select an analytics result, and may transmit the information, the analytics result, or both, to the originator of the analytics request. In this way, the various network entities (e.g., of the core network 130 and the RAN) may coordinate RAN node registration and discovery.

Figure 2:
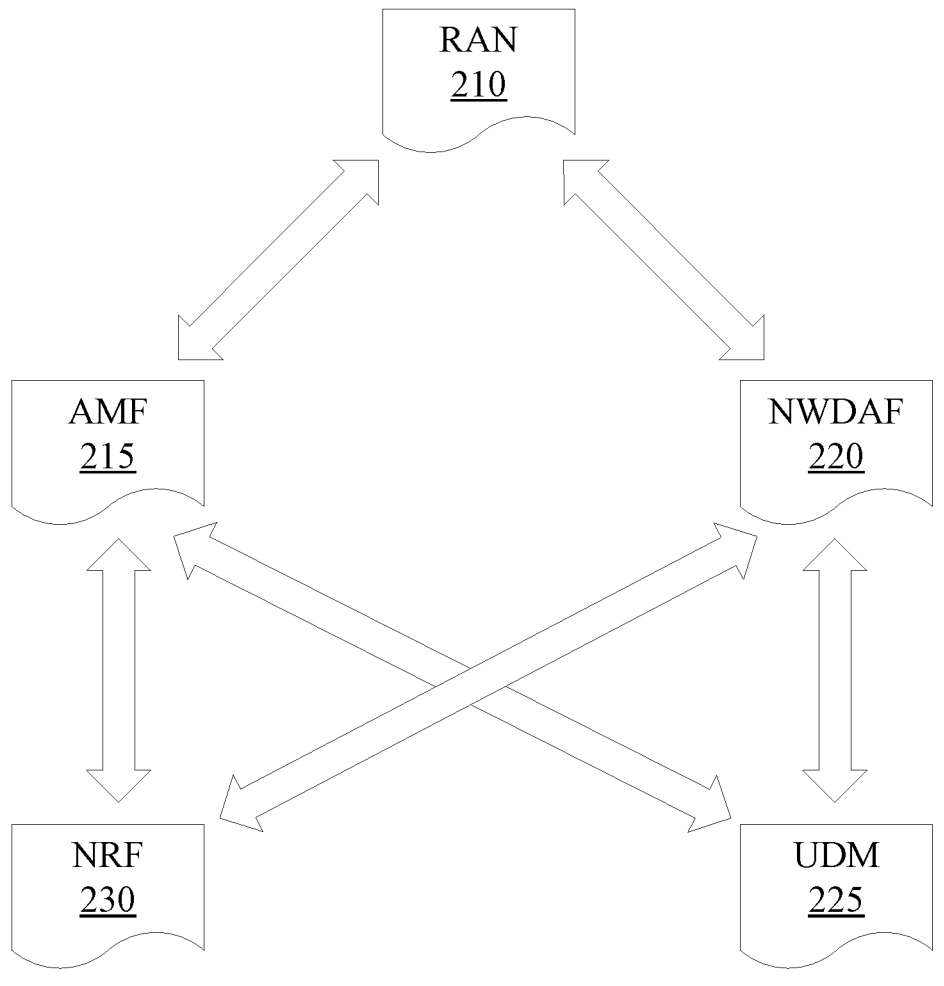
FIG. 2 illustrates an example of a system that supports RAN node registration and discovery in accordance with aspects of the present disclosure.

FIG. 2 illustrates an example of a system 200 that supports RAN node registration and discovery in accordance with aspects of the present disclosure. The system 200 may include a RAN 210, an AMF 215, and NWDAF 220, a UDM 225, and an NRF 230. In the system 200, the NWDAF may be included or associated with a core network (CN), and the NWDAF may be enhanced in enablers for network automation. In some examples, data collection (e.g., data collection associated with analytics processing) may be provided by network functions (NFs) of the CN, such as an AMF, a session management function (SMF), a policy control function (PCF), an NRF, a network exposure function (NEF), or any combination thereof. Data collection may further be performed by one or more application functions (AFs), operations, administration and maintenance (OAM), data repositories, or any combination thereof. Data exposure may also be performed. For example, analytics information may be provisioned in an on-demand fashion to one or more NFs of the CN, one or more AFs, the OAM, data repositories, or any combination thereof. For example, data associated with one or more devices or RAN nodes may be collected and analyzed to provide analytics information to a requester of the analytics information. Such analytics operations or processing may be performed with the use of AI or ML, which may provide one or more predictions or decisions for the target of the analytics processing (e.g., the one or more devices or RAN nodes). The devices or RAN nodes may then perform optimization or adjustment (e.g., in various areas or use cases, including load balancing, mobility optimization or adjustment, energy savings, other use cases, or any combination thereof).

However, in some approaches or examples, the behavior of various network entities may not be defined or may be inadequate. Thus, a need exists for the definition or improvement of such behaviors, so that the analytics collection, analysis, and reports may be done in an effective manner.

In some examples, the AMF 215 may receive a request from a RAN entity (e.g., a RAN entity associated with the RAN 210). The setup request may include information associated with the RAN entity (e.g., one or more identifiers, one or more characteristics of the RAN node, other information, or any combination thereof). The information associated with the RAN entity may include a configuration or profile that may be associated with the RAN entity. In some examples, the AMF 215 may transmit a setup response to the RAN entity, and may do so based on the received request from the RAN entity. In some examples, the setup response may include a RAN profile for the RAN entity. In some examples, the AMF 215 may transmit a RAN registration message that may include the RAN profile for the RAN entity. In some examples, the AMF 215 may transmit the RAN registration message to a NRF, a UDM, or both.

In some examples, the NWDAF 220 may coordinate one or more operations associated with analytics collection or processing. For example, the NWDAF 220 may receive an analytics request from a requester (e.g., a device), and the request may include an indication of one or more target devices for analytics processing. For example, the request may indicate one or more UEs, base stations, or other devices, for which the requester is requesting analytics information. The NWDAF 220 may transmit a query or request to discover one or more RAN nodes that may be associated with the targets for which analytics information is being request. For example, the NWDAF 220 may request or query (e.g., based on the specified one or more targets) one or more network entities (e.g., the NRF 230, the UDM 225, or both) for information associated with the targets (e.g., information that may identify one or more RAN entities that may be associated with the one or more target devices). The NWDAF 220 may receive a response that may identify the one or more RAN entities associated with the target devices (e.g., one or more RAN entities associated with the RAN 210). In some examples, the NWDAF 220 may transmit (e.g., after receiving the response) a data collection request to the one or more RAN entities (e.g., to obtain information that may be helpful or relevant to the requested analytics). In some examples, the NWDAF 220 may transmit the data collection request to a single RAN entity, or may transmit the data collection request to multiple RAN entities. In some examples, a RAN entity that may receive such a request may determine one or more additional RAN entities associated with the request (e.g., that are identified in the request or that may have access to information associated with an identified RAN entity), and may further transmit the request to one or more additional RAN entities. In some examples, the NWDAF 220 may receive information from one or more RAN entities or may receive one or more data collection responses, and the responses may include analytics information associated with the one or more target devices. The NWDAF 220 may (e.g., in response to receiving one or more data collection responses) transmit the collected data or analytics information to the requester of the analytics information.

The UDM 225 may receive (e.g., from the AMF 215), RAN information that may be associated with a set of RAN entities. Such information may include one or more identifiers, one or more configurations, one or more profiles, other information, or any combination thereof. The UDM 225 may store (e.g., at the UDM 225) the RAN information. The UDM 225 may receive (e.g., from the NWDAF 220) a query or request for information associated with one or more target devices (e.g., one or more target devices, which may be associated with the RAN 210, that may store information associated with or requested by the analytics request, or may store information about a RAN node that may store such information). The UDM 225 may identify one or more RAN entities (e.g., one or more RAN entities of the set of RAN entities), and may do so based on the one or more target devices, the stored RAN information, or any combination thereof. The UDM 225 may transmit a response to the NWDAF 220 that may include an indication of the one or more identified RAN entities. For example, the UDM may transmit one or more identifiers associated with the one or more RAN entities, so that the NWDAF 220 may retrieve information (e.g., analytics information) from the one or more RAN entities.

The NRF 230 may receive (e.g., from the AMF 215), a set of RAN profiles that may be for or may be associated with a set of RAN entities. Such RAN profiles may include one or more identifiers, one or more configurations, other information, or any combination thereof. The NRF 230 may register (e.g., at the NRF 230) the set of RAN profiles. The NRF 230 may receive (e.g., from the NWDAF 220) a query or request for information that may identify or may be associated with one or more target devices (e.g., one or more target devices, which may be associated with the RAN 210, that may store information associated with or requested by the analytics request, or may store information about a RAN node that may store such information). The NRF 230 may identify one or more RAN entities (e.g., one or more RAN entities of the set of RAN entities), and may do so based on the one or more target devices, the stored RAN profiles, or any combination thereof. The NRF 230 may transmit a response to the NWDAF 220 that may include an indication of the one or more identified RAN entities. For example, the UDM may transmit one or more identifiers associated with the one or more RAN entities, so that the NWDAF 220 may retrieve information (e.g., analytics information) from the one or more RAN entities.

Figure 3:
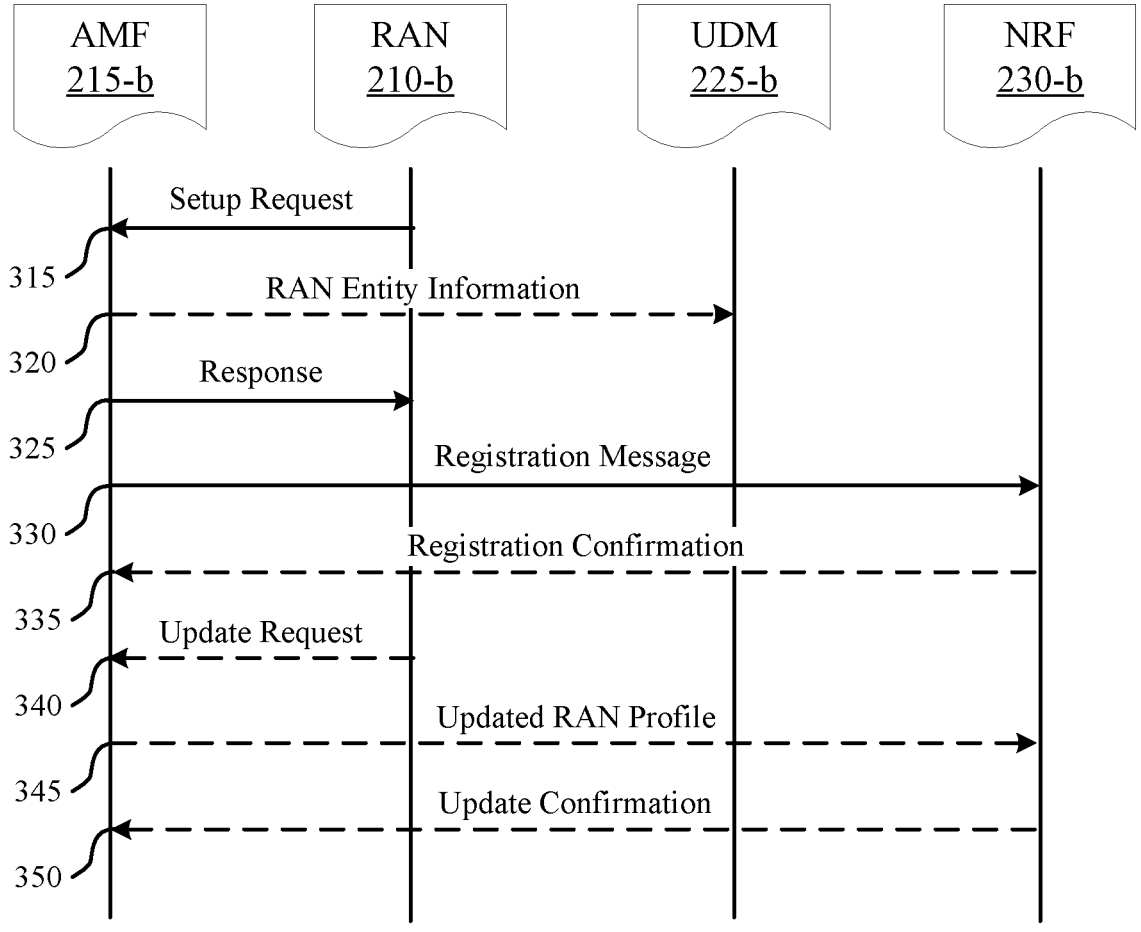
FIG. 3 illustrates an example of a process flow that supports RAN node registration and discovery in accordance with aspects of the present disclosure.

FIG. 3 illustrates an example of a process flow 300 that supports RAN node registration and discovery in accordance with aspects of the present disclosure. The process flow 300 may be an example of a process by which RAN information may be registered to a UDM, an NRF, or both to support subsequent RAN discovery as described herein. The process flow 300 may implement various aspects of the present disclosure described with reference to FIGS. 1-2. The process flow 300 may be implemented by an AMF 215-*b*, a RAN 210-*b*, a UDM 225-*b*, and an NRF 230-*b*, which may be examples of AMF 215, RAN 210, UDM 225, and NRF 230 as described with reference to FIGS. 1-2.

In the following description of the process flow 300, the operations between the AMF 215-*b*, a RAN 210-*b*, a UDM 225-*b*, and an NRF 230-*b* may be performed in different orders or at different times. Some operations may also be left out of the process flow 300, or other operations may be added. Although the AMF 215-*b*, the RAN 210-*b*, the UDM 225-*b*, and the NRF 230-*b* are shown performing the operations of the process flow 300, some aspects of some operations may also be performed by the AMF 215-*b*, a RAN 210-*b*, a UDM 225-*b*, the NRF 230-*b*, one or more other wireless devices, or any combination thereof.

At 315, the AMF 215-*b* may receive a network entity setup request from a radio access network entity. In some examples, the RAN 210-*b* may register a configuration (e.g., a configuration for a device that is to be registered with the network, the CN, the AMF 215-*b*, or other network entity), and may do so via a setup request (e.g., an NG setup request).

At 320, the AMF 215-*b* may transmit, to a unified data management function and based at least in part on the network entity setup request, radio access network entity information associated with the radio access network entity. The radio access network entity information comprises a radio access network entity identifier for the radio access network entity, a radio access network entity name for the radio access network entity, or both. In some examples, the AMF 215-*b* may register information about a RAN entity (e.g., a served UE) to be stored in the UDM 225-*b*. In such a procedure, the AMF 215-*b* may transmit a message (e.g., a Nudm_UECM_Registration request) that may include information such as a global RAN node identifier associated with the RAN entity, a RAN node name associated with the RAN entity, or both, to the UDM 225-*b*. In some examples, the UDM 225-*b* may store such information, including a global RAN node identifier associated with the RAN entity, a RAN node name associated with the RAN entity, or both. In some examples, the AMF 215-*b* may receive a response from the UDM 225-*b* (e.g., a Nudm_UECM_Registration response).

At 325, the AMF 215-*b* may transmit, to the radio access network entity and based at least in part on the network entity setup request, a setup response that may include a radio access network profile for the radio access network entity. In some examples, the setup response may be a NG setup response.

At 330, the AMF 215-*b* may transmit, to a network repository function and based at least in part on the network entity setup request, a radio access network registration message comprising the radio access network profile for the radio access network entity. The radio access network profile may include a radio access network entity identifier for the radio access network entity, a radio access network entity name for the radio access network entity, one or more registration areas supported by the radio access network entity, registration area code slice information for the radio access network entity, or any combination thereof. In some examples, the AMF 215-*b* may register a RAN configuration to the NRF 230-*b* via a registration message (e.g., a Nnrf_RANmanagement_RAN registration message). In some examples, a RAN profile or configuration (e.g., the RAN profile or the RAN configuration) may include a global RAN node identifier, a RAN node name, a supported tracking area (TA) list, supported slice information for the TA code (TAC), or any combination thereof.

At 335, the AMF 215-*b* may receive a confirmation message from the network repository function that may indicate that the radio access network profile for the radio access network entity has been registered at the network repository function. In some examples, such a confirmation message may be or include a Nnrf_RANmanagement_RAN response message.

At 340, the AMF 215-*b* may receive, from the radio access network entity, a request to update the radio access network profile for the radio access network entity. In some examples, the RAN 210-*b* may further update configuration information to AMF 215-*b* (e.g., via a RAN configuration update procedure).

At 345, the AMF 215-*b* may transmit, to the network repository function, an updated radio access network profile for the radio access network entity. The updated radio access network profile may include an updated radio access network entity identifier for the radio access network entity, an updated radio access network entity name for the radio access network entity, or both. In some examples, if the AMF 215-*b* receive an update procedure or request (e.g., the update request received at 340), the AMF 215-*b* may further update a RAN profile (e.g., the RAN profile or configuration) at the NRF 230-*b*.

At 350, the AMF 215-*b* may receive a confirmation message from the network repository function indicating that the updated radio access network profile for the radio access network entity has been registered at the network repository function.

Figure 4:
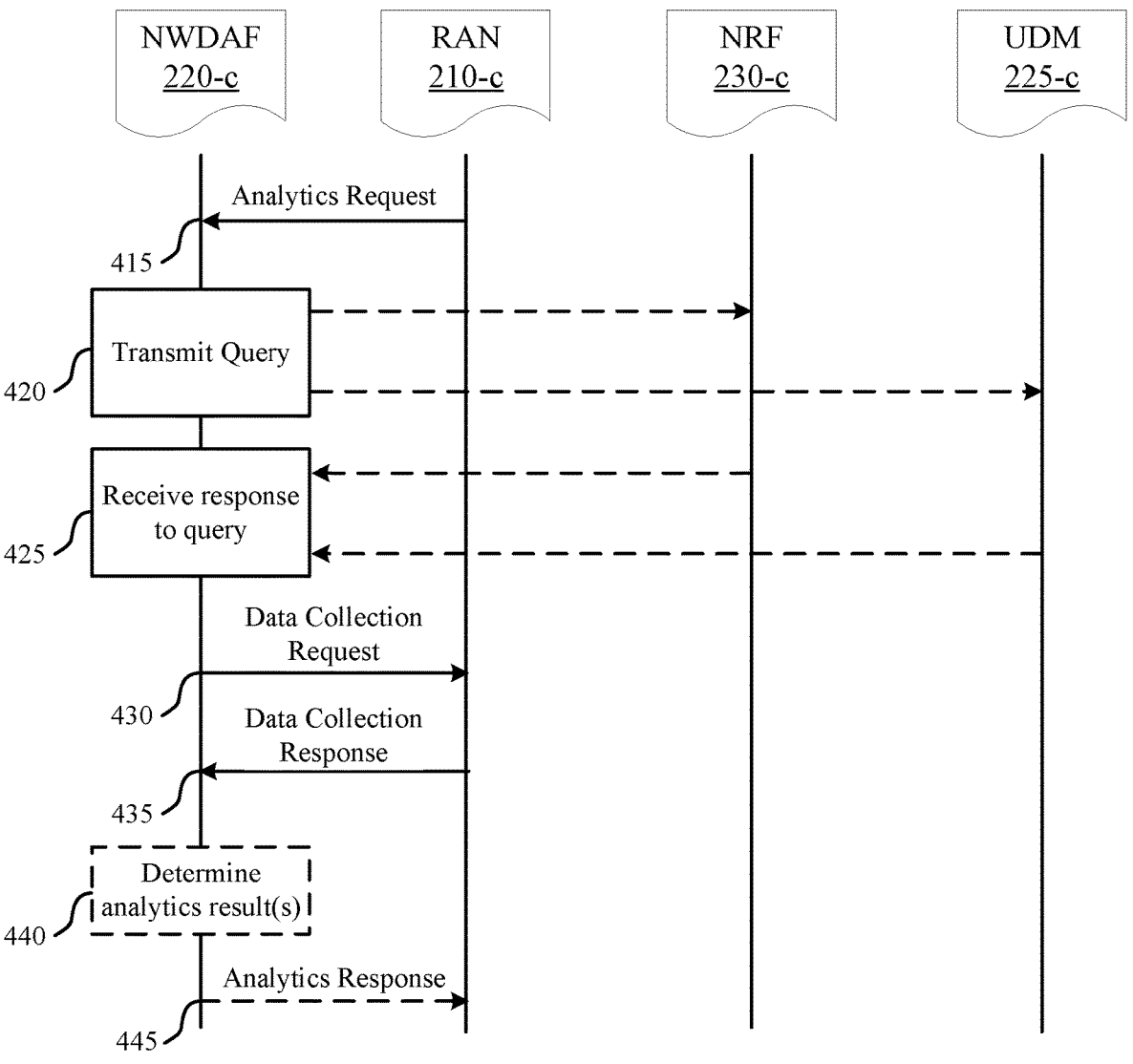
FIG. 4 illustrates an example of a process flow that supports RAN node registration and discovery in accordance with aspects of the present disclosure.

FIG. 4 illustrates an example of a process flow 400 that supports RAN node registration and discovery in accordance with aspects of the present disclosure. The process flow 400 may be an example of a process by which RAN information may be discovered by a NWDAF as described herein. The process flow 400 may implement various aspects of the present disclosure described with reference to FIGS. 1-3. The process flow 400 may be implemented by an AMF 215-*c*, a RAN 210-*c*, a UDM 225-*c*, and an NRF 230-*c*, which may be examples of AMF 215, RAN 210, UDM 225, and NRF 230 as described with reference to FIGS. 1-3.

In the following description of the process flow 400, the operations between the AMF 215-*c*, a RAN 210-*c*, a UDM 225-*c*, and an NRF 230-*c* may be performed in different orders or at different times. Some operations may also be left out of the process flow 400, or other operations may be added. Although the AMF 215-*c*, the RAN 210-*c*, the UDM 225-*c*, and the NRF 230-*c* are shown performing the operations of the process flow 400, some aspects of some operations may also be performed by the AMF 215-*c*, a RAN 210-*c*, a UDM 225-*c*, the NRF 230-*c*, one or more other wireless devices, or any combination thereof.

At 415, the NWDAF 220-*c* may receive an analytics request from a device. The analytics request may include an indication of one or more target devices for analytics processing. The indication of one or more target devices may include an indication of one or more registration areas, an indication of one or more network slices, or both. The indication of one or more target devices may include an indication of one or more network subscription identifiers, one or more identifiers for one or more groups of target devices, one or more UEs, or any combination thereof. In some examples, the device may include an access and mobility management function, a service management function, a policy control function, a second radio access network entity, a core network entity, an application function, an operations, administration and maintenance function, or any combination thereof.

In some examples, a consumer (e.g., the device discussed above, or a device associated with the RAN 210-c) may transmit the analytics request to the NWDAF 220-c. The analytics request may include one or more targets for analytics processing or reporting. The request may further include one or more areas of interest for analytics processing. For example, a target of analytics reporting may be or indicate one or more objects for which analytics information may be requested. For example, such targets may include entities such as one or more specific UEs, a group of UEs, or any UE (e.g., all UEs in a group).

In some examples, the consumer may request analytics for a specific registration area, a single network slice selection assistance information (S-NSSAI), or both. In such a case, the NWDAF 220-c may discover one or more RAN nodes or RAN entities that may correspond to the registration area, the S-NSSAI, or both.

At 420, the NWDAF 220-c may transmit a query based at least in part on the analytics request. The query may include a request for information identifying one or more radio access network entities associated with the one or more target devices. Transmitting the query may include transmitting the query to a network repository function. The request for information associated with the one or more target devices may include a request for information associated with the one or more registration areas, the one or more network slices, or both. Transmitting the query may include transmitting the query to a unified data management function. The request for information associated with the one or more target devices may include a request for information associated with the one or more network subscription identifiers, the one or more identifiers for the one or more groups of target devices, the one or more UEs, or any combination thereof. The information identifying the one or more radio access network entities may include information identifying a radio access network entity that may be associated with one of the one or more UEs. The information identifying the one or more radio access network entities may include a list of one or more radio access network entity identifiers. In some examples, the NWDAF 220-c may transmit a RAN query request to the NRF 230-c by including a registration area indication (RAI), the S-NSSAI, or both. Such a transmission may be based on the received analytics request. In some examples, the NWDAF 220-c may discover one or more RAN nodes that may have served the one or more targets (e.g., one or more UEs). The NWDAF 220-c may transmit a RAN query to the UDM 225-c, and may do so by including a subscription permanent identifier (SUPI) (e.g., for one or more specific UEs) or a group identifier (e.g., for a group of UEs).

At 425, the NWDAF 220-c may receive a response to the query that may include the information identifying the one or more radio access network entities associated with the one or more target devices. The information identifying the one or more radio access network entities may include information identifying a radio access network entity that may be associated with one of the one or more UEs. The information identifying the one or more radio access network entities may include a list of one or more radio access network entity identifiers. In some examples, the NRF 230-c may have information associated with the RAN profile or RAN configuration, and may transmit a list of RAN nodes to the NWDAF 220-c. In some examples, the NWDAF 220-c may receive, from the UDM 225-c, the requested RAN node information. For example, if the NWDAF 220-c has requested RAN node information for a single target (e.g., a single UE), the NWDAF 220-c may receive such RAN node information associated with a single RAN node. If the NWDAF 220-c has requested RAN node associated with multiple targets (e.g., for a plurality of UEs, or a group of UEs), the NWDAF 220-c may receive such RAN node information associated with multiple RAN nodes.

At 430, the NWDAF 220-c may transmit a data collection request to a radio access network entity based at least in part on the response to the query. The one or more radio access network entities may include at least the radio access network entity. In some examples, the NWDAF 220-c may transmit the data collection request in response to receiving the response to the query that was transmitted by the NRF 230-c. In some examples, a UE, a RAN node, or other device, may register an indication of a serving RAN node to the UDM 225-c. The UDM 225-c may store RAN node information (e.g., the indication of the serving RAN node, other RAN node information, or both). In some examples, the NWDAF 220-c may transmit the data collection request (e.g., to one or more RAN nodes) based on information received from the UDM 225-c.

At 435, the NWDAF 220-c may receive, from the radio access network entity in response to the data collection request, a data collection response comprising analytics information associated with the one or more target devices. For example, the NWDAF 220-c may receive the requested data (e.g., that may be analytics information or may be associated with analytics information) from one or more RAN nodes.

At 440, the NWDAF 220-c may determine one or more analytics results based at least in part on the analytics information.

At 445, the NWDAF 220-c may transmit, to the device and in response to receiving the analytics request, an analytics response that may include the analytics information associated with the one or more target devices. The analytics response may include the one or more analytics results.

Figure 5:
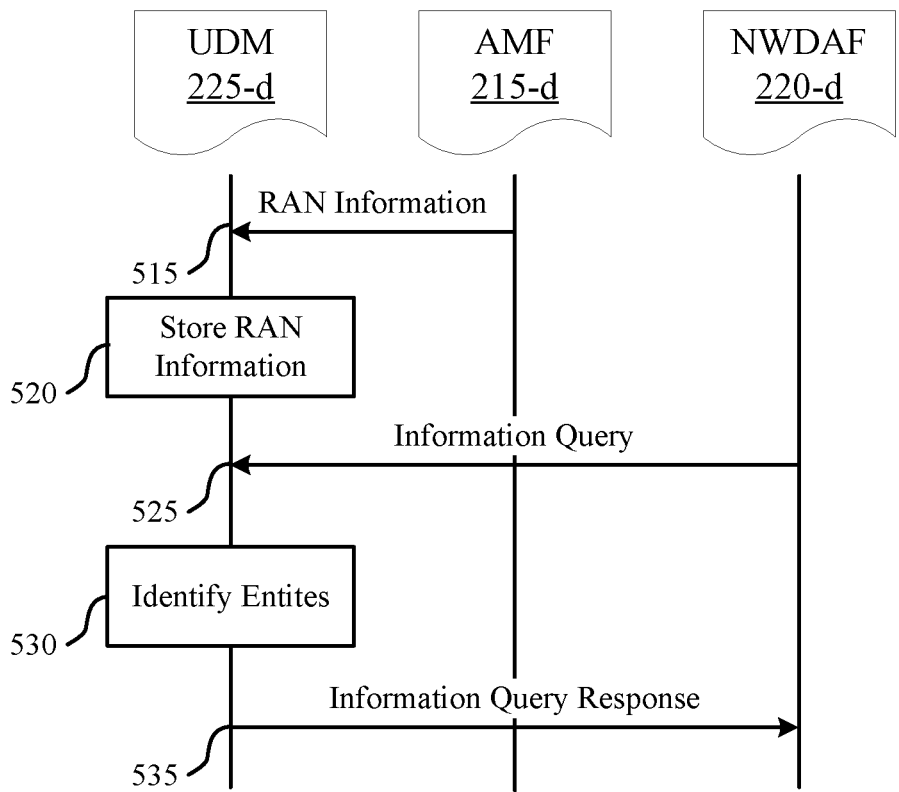
FIG. 5 illustrates an example of a process flow that supports RAN node registration and discovery in accordance with aspects of the present disclosure.

FIG. 5 illustrates an example of a process flow 500 that supports RAN node registration and discovery in accordance with aspects of the present disclosure. The process flow 500 may be an example of a process by which RAN information may be registered to and queried from a UDM to support subsequent RAN discovery as described herein. The process flow 500 may implement various aspects of the present disclosure described with reference to FIGS. 1-4. The process flow 500 may be implemented by an AMF 215-d, a UDM 225-d, and an NWDAF 220-d, which may be examples of AMF 215, UDM 225, and NWDAF 220 as described with reference to FIGS. 1-4.

In the following description of the process flow 500, the operations between the AMF 215-d, the UDM 225-d, and the NWDAF 220-d may be performed in different orders or at different times. Some operations may also be left out of the process flow 500, or other operations may be added.

Although the AMF 215-*d*, the UDM 225-*d*, and the NWDAF 220-*d* are shown performing the operations of the process flow 500, some aspects of some operations may also be performed by the AMF 215-*d*, the UDM 225-*d*, the NWDAF 220-*d*, one or more other wireless devices, or any combination thereof.

At 515, the UDM 225-*d* may receive, from an access and mobility management function, radio access network information associated with a set of radio access network entities. The radio access network information may include a radio access network entity identifier, a radio access network entity name, or both. The radio access network information may be received as part of a registration area update procedure.

At 520, the UDM 225-*d* may store, at the unified data management function, the radio access network information associated with the set of radio access network entities.

At 525, the UDM 225-*d* may receive, from a network data analytics function, a query for information associated with one or more target devices for analytics processing. The query may include a request for information associated with one or more network subscription identifiers, one or more identifiers for one or more groups of target devices, one or more UEs or any combination thereof.

At 530, the UDM 225-*d* may identify, in response to the query, one or more radio access network entities of the set of radio access network entities based at least in part on the one or more target devices, the stored radio access network information, or any combination thereof. Identifying the one or more radio access network entities of the set of radio access network entities may be based at least in part on the one or more network subscription identifiers, the one or more identifiers for the one or more groups of target devices, the one or more UEs, or any combination thereof.

At 535, the UDM 225-*d* may transmit, to the network data analytics function, a response to the query comprising an indication of the identified one or more radio access network entities. The indication of the identified one or more radio access network entities may include a radio access network entity identifier associated with a radio access network entity that may be associated with one of the one or more UEs. The indication of the identified one or more radio access network entities may include a list of one or more radio access network entity identifiers.

Figure 6:
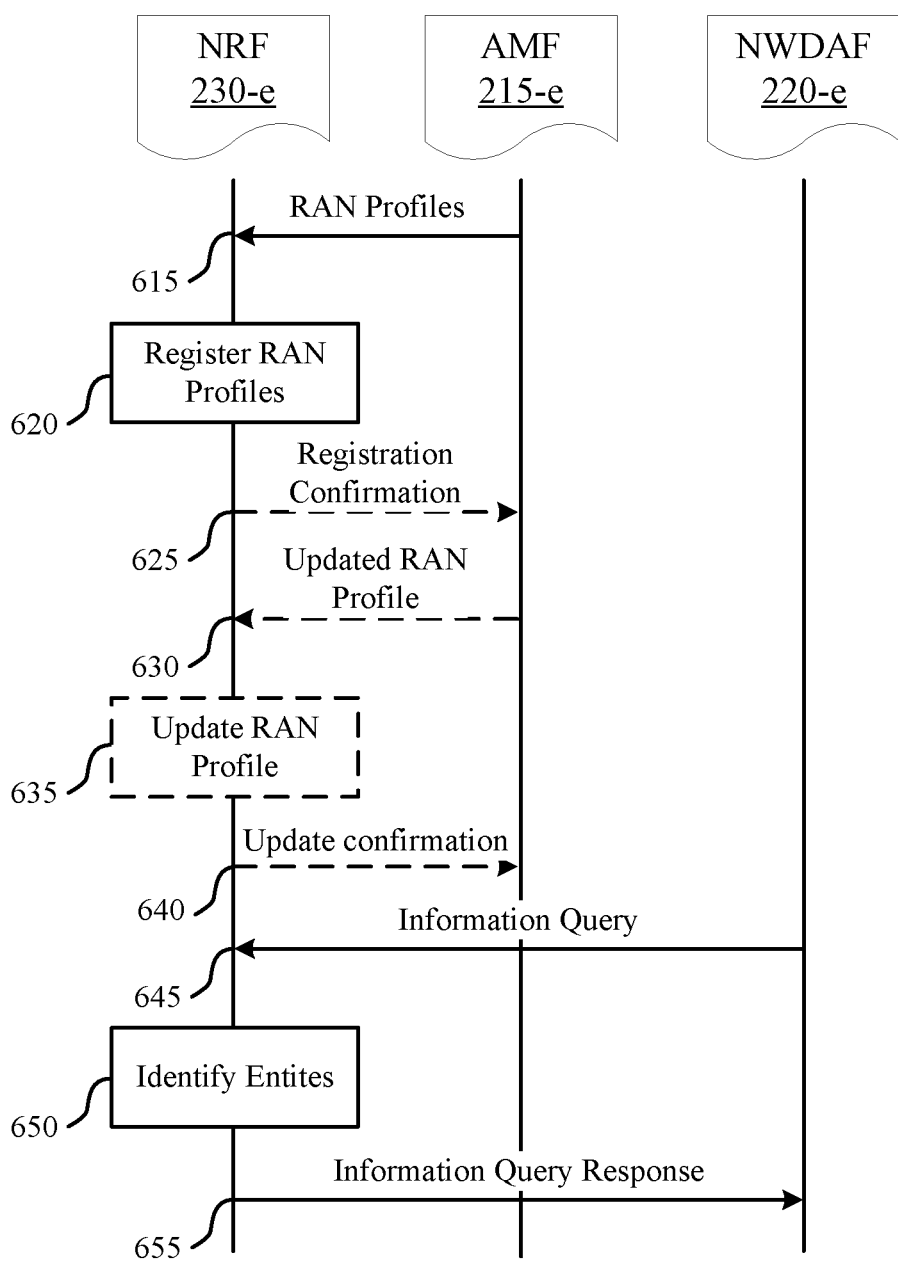
FIG. 6 illustrates an example of a process flow that supports RAN node registration and discovery in accordance with aspects of the present disclosure.

FIG. 6 illustrates an example of a process flow 600 that supports RAN node registration and discovery in accordance with aspects of the present disclosure. The process flow 500 may be an example of a process by which RAN information may be registered to and queried from an NRF to support subsequent RAN discovery as described herein. The process flow 600 may be implemented by various aspects of the present disclosure as described with reference to FIGS. 1-5. The process flow 600 may include an AMF 215-*e*, an NRF 230-*e*, and an NWDAF 220-*e*. which may be examples of AMF 215, UDM 225, and NWDAF 220 as described with reference to FIGS. 1-5.

In the following description of the process flow 600, the operations between the AMF 215-*e*, the NRF 230-*e*, and the NWDAF 220-*e* may be performed in different orders or at different times. Some operations may also be left out of the process flow 600, or other operations may be added. Although the AMF 215-*e*, the NRF 230-*e*, and the NWDAF 220-*e* are shown performing the operations of the process flow 600, some aspects of some operations may also be performed by the AMF 215-*e*, the NRF 230-*e*, the NWDAF 220-*e*, one or more other wireless devices, or any combination thereof.

At 615, the NRF 230-*e* may receive, from an access and mobility management function, a set of radio access network profiles for a set of radio access network entities. Each radio access network profile of the set of radio access network profiles may include a radio access network entity identifier, a radio access network entity name, one or more supported registration areas, network slicing information, or any combination thereof.

At 620, the NRF 230-*e* may register the set of radio access network profiles at the network repository function.

At 625, the NRF 230-*e* may transmit, to the access and mobility management function, a confirmation message that may indicate that the set of radio access network profiles has been registered at the network repository function.

At 630, the NRF 230-*e* may receive an updated radio access network profile comprising an update flag. The updated radio access network profile may include a radio access network entity identifier, a radio access network entity name, or both.

At 635, the NRF 230-*e* may update a radio access network profile of the set of radio access network profiles based at least in part on the updated radio access network profile. The updated radio access network profile may include a radio access network entity identifier, a radio access network entity name, or both.

At 640, the NRF 230-*e* may transmit a confirmation message that may indicate that the radio access network profile of the set of radio access network profiles has been updated.

At 645, the NRF 230-*e* may receive, from a network data analytics function, a query for information identifying one or more radio access network entities associated with one or more target devices for analytics processing. The query may include a request for information associated with one or more registration areas, one or more network slices, or both.

At 650, the NRF 230-*e* may identify, in response to the query, one or more radio access network entities of the set of radio access network entities based at least in part on the one or more target devices, the set of radio access network profiles, or any combination thereof. Identifying the one or more radio access network entities may be based at least in part on the one or more registration areas, the one or more network slices, or both.

Figure 7:
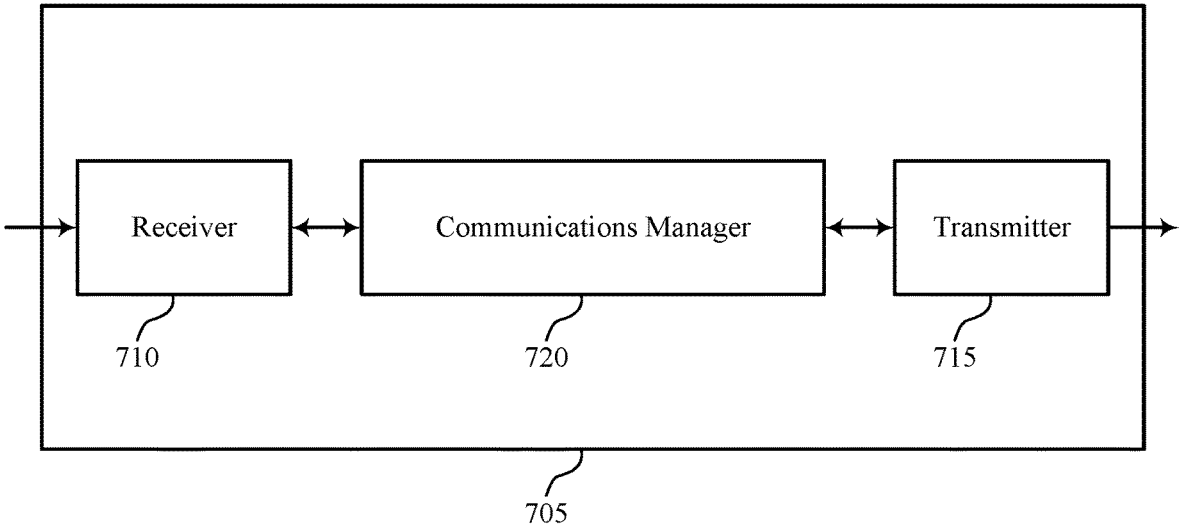
FIGS. 7 and 8 show block diagrams of devices that support RAN node registration and discovery in accordance with aspects of the present disclosure.

At 655, the NRF 230-*e* may transmit, to the network data analytics function, a response to the query that may include an indication of the identified one or more radio access network entities. The indication of the identified one or more radio access network entities may include a list of one or more radio access network entity identifiers FIG. 7 shows a block diagram 700 of a device 705 that supports RAN node registration and discovery in accordance with aspects of the present disclosure. The device 705 may be an example of aspects of an AMF as described herein. The device 705 may include a receiver 710, a transmitter 715, and a communications manager 720.

The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to RAN node registration and discovery). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to RAN node registration and discovery). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of RAN node registration and discovery as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a DSP, an ASIC, a field programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at an access and mobility management function in accordance with examples as disclosed herein. For example, the communications manager 720 may be configured as or otherwise support a means for receiving a network entity setup request from a radio access network entity. The communications manager 720 may be configured as or otherwise support a means for transmitting, to the radio access network entity and based on the network entity setup request, a setup response including a radio access network profile for the radio access network entity. The communications manager 720 may be configured as or otherwise support a means for transmitting, to a network repository function and based on the network entity setup request, a radio access network registration message including the radio access network profile for the radio access network entity.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced processing, reduced power consumption, more efficient utilization of communication resources, or a combination thereof.

Figure 8:
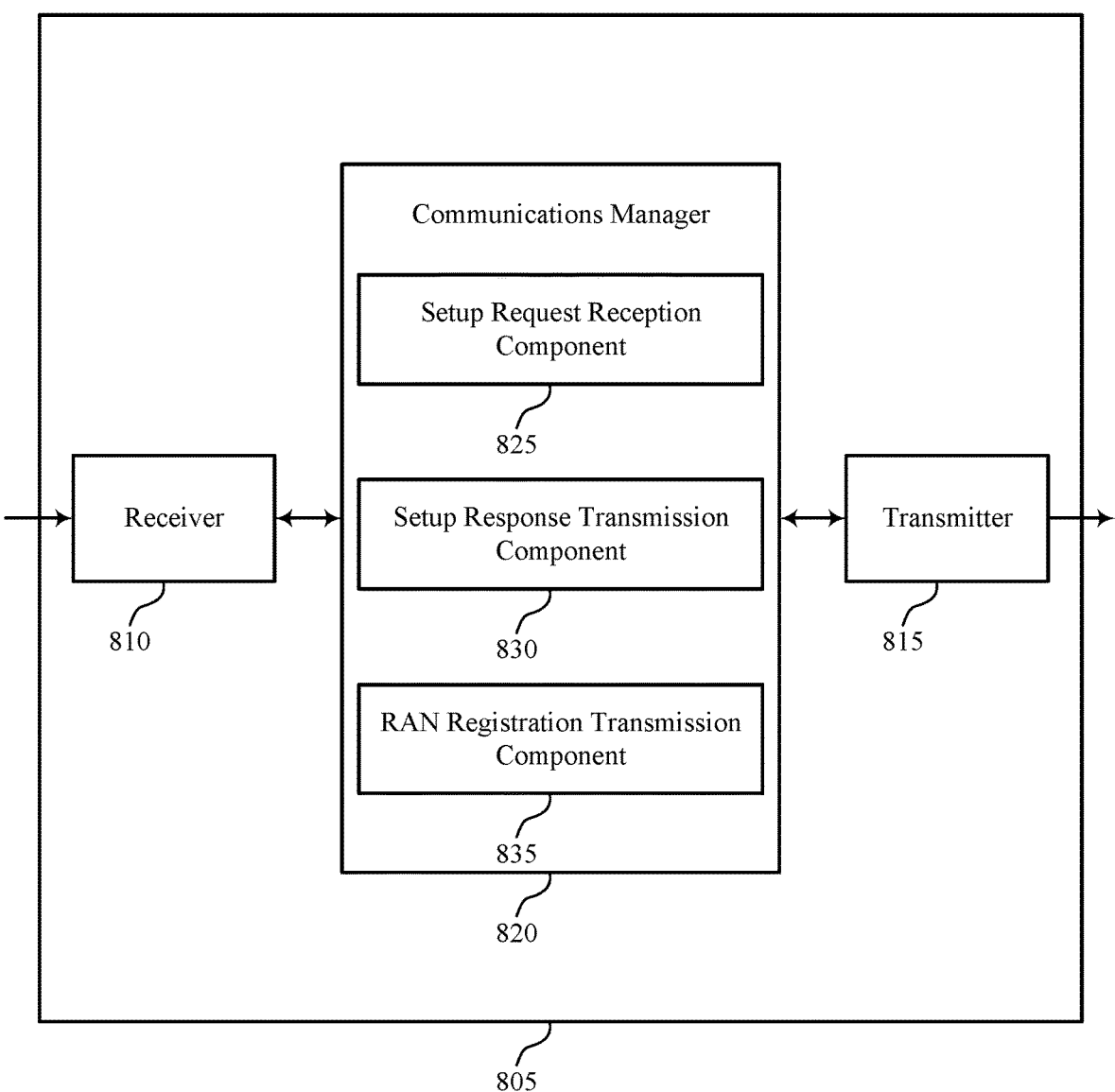

FIG. 8 shows a block diagram 800 of a device 805 that supports RAN node registration and discovery in accordance with aspects of the present disclosure. The device 805 may be an example of aspects of a device 705 or an AMF as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to RAN node registration and discovery). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to RAN node registration and discovery). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of RAN node registration and discovery as described herein. For example, the communications manager 820 may include a setup request reception component 825, a setup response transmission component 830, a RAN registration transmission component 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at an access and mobility management function in accordance with examples as disclosed herein. The setup request reception component 825 may be configured as or otherwise support a means for receiving a network entity setup request from a radio access network entity. The setup response transmission component 830 may be configured as or otherwise support a means for transmitting, to the radio access network entity and based on the network entity setup request, a setup response including a radio access network profile for the radio access network entity. The RAN registration transmission component 835 may be configured as or otherwise support a means for transmitting, to a network repository function and based on the network entity setup request, a radio access network registration message including the radio access network profile for the radio access network entity.

Figure 9:
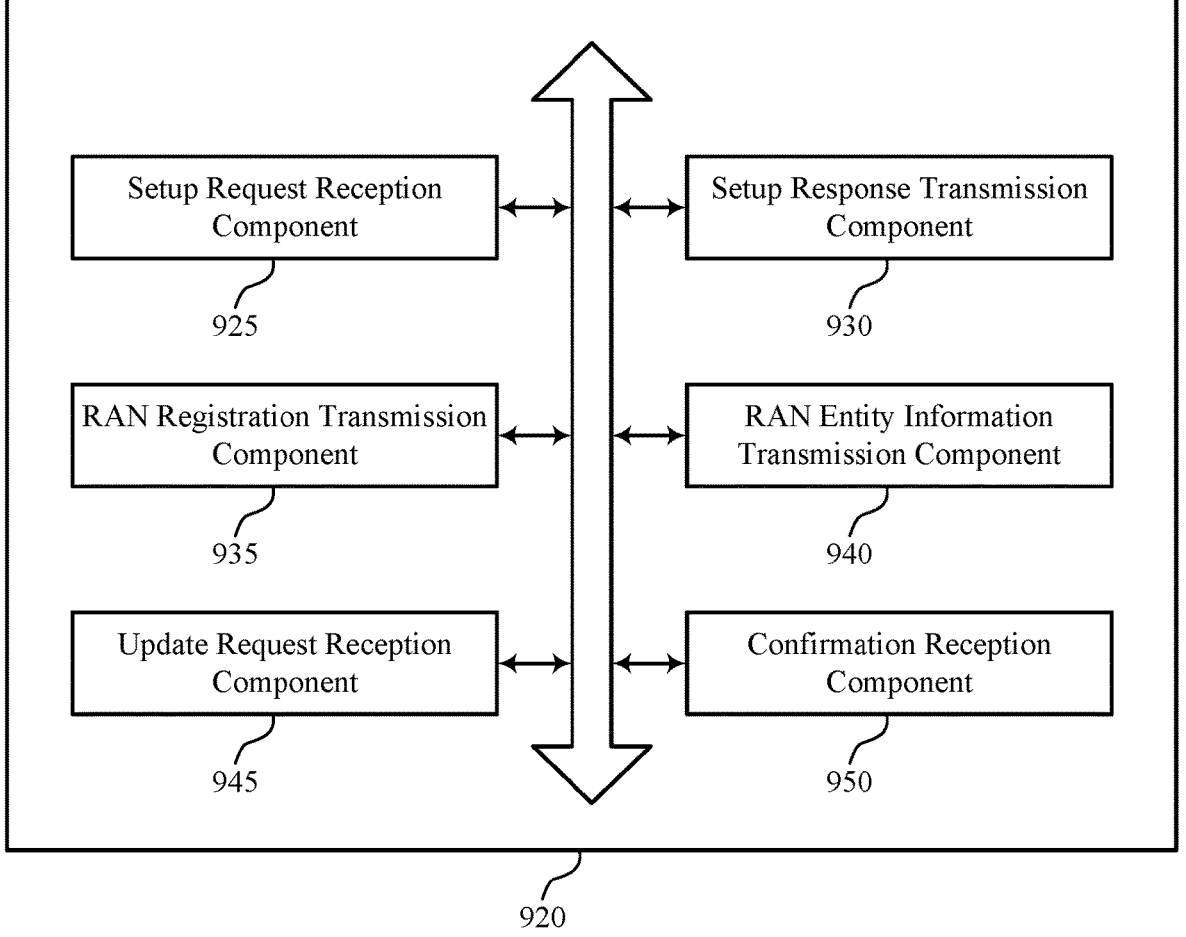
FIG. 9 shows a block diagram of a communications manager that supports RAN node registration and discovery in accordance with aspects of the present disclosure.

FIG. 9 shows a block diagram 900 of a communications manager 920 that supports RAN node registration and discovery in accordance with aspects of the present disclosure. The communications manager 920 may be an example of aspects of a communications manager 720, a communications manager 820, or both, as described herein. The communications manager 920, or various components thereof, may be an example of means for performing various aspects of RAN node registration and discovery as described herein. For example, the communications manager 920 may include a setup request reception component 925, a setup response transmission component 930, a RAN registration transmission component 935, a RAN entity information transmission component 940, an update request reception component 945, a confirmation reception component 950, or any combination thereof. Each of these components may communicate, directly or indirectly, with one another (e.g., via one or more buses).

The communications manager 920 may support wireless communications at an access and mobility management function in accordance with examples as disclosed herein. The setup request reception component 925 may be configured as or otherwise support a means for receiving a network entity setup request from a radio access network entity. The setup response transmission component 930 may be configured as or otherwise support a means for transmitting, to the radio access network entity and based on the network entity setup request, a setup response including a radio access network profile for the radio access network entity. The RAN registration transmission component 935 may be configured as or otherwise support a means for transmitting, to a network repository function and based on the network entity setup request, a radio access network registration message including the radio access network profile for the radio access network entity.

In some examples, the RAN entity information transmission component 940 may be configured as or otherwise support a means for transmitting, to a unified data management function and based on the network entity setup request, radio access network entity information associated with the radio access network entity.

In some examples, the radio access network entity information includes a radio access network entity identifier for the radio access network entity, a radio access network entity name for the radio access network entity, or both.

In some examples, the update request reception component 945 may be configured as or otherwise support a means for receiving, from the radio access network entity, a request to update the radio access network profile for the radio access network entity. In some examples, the RAN registration transmission component 935 may be configured as or otherwise support a means for transmitting, to the network repository function, an updated radio access network profile for the radio access network entity. In some examples, the confirmation reception component 950 may be configured as or otherwise support a means for receiving a confirmation message from the network repository function indicating that the updated radio access network profile for the radio access network entity has been registered at the network repository function.

In some examples, the updated radio access network profile includes an updated radio access network entity identifier for the radio access network entity, an updated radio access network entity name for the radio access network entity, or both.

In some examples, the radio access network profile includes a radio access network entity identifier for the radio access network entity, a radio access network entity name for the radio access network entity, one or more registration areas supported by the radio access network entity, registration area code slice information for the radio access network entity, or any combination thereof.

In some examples, the confirmation reception component 950 may be configured as or otherwise support a means for receiving a confirmation message from the network repository function indicating that the radio access network profile for the radio access network entity has been registered at the network repository function.

Figure 10:
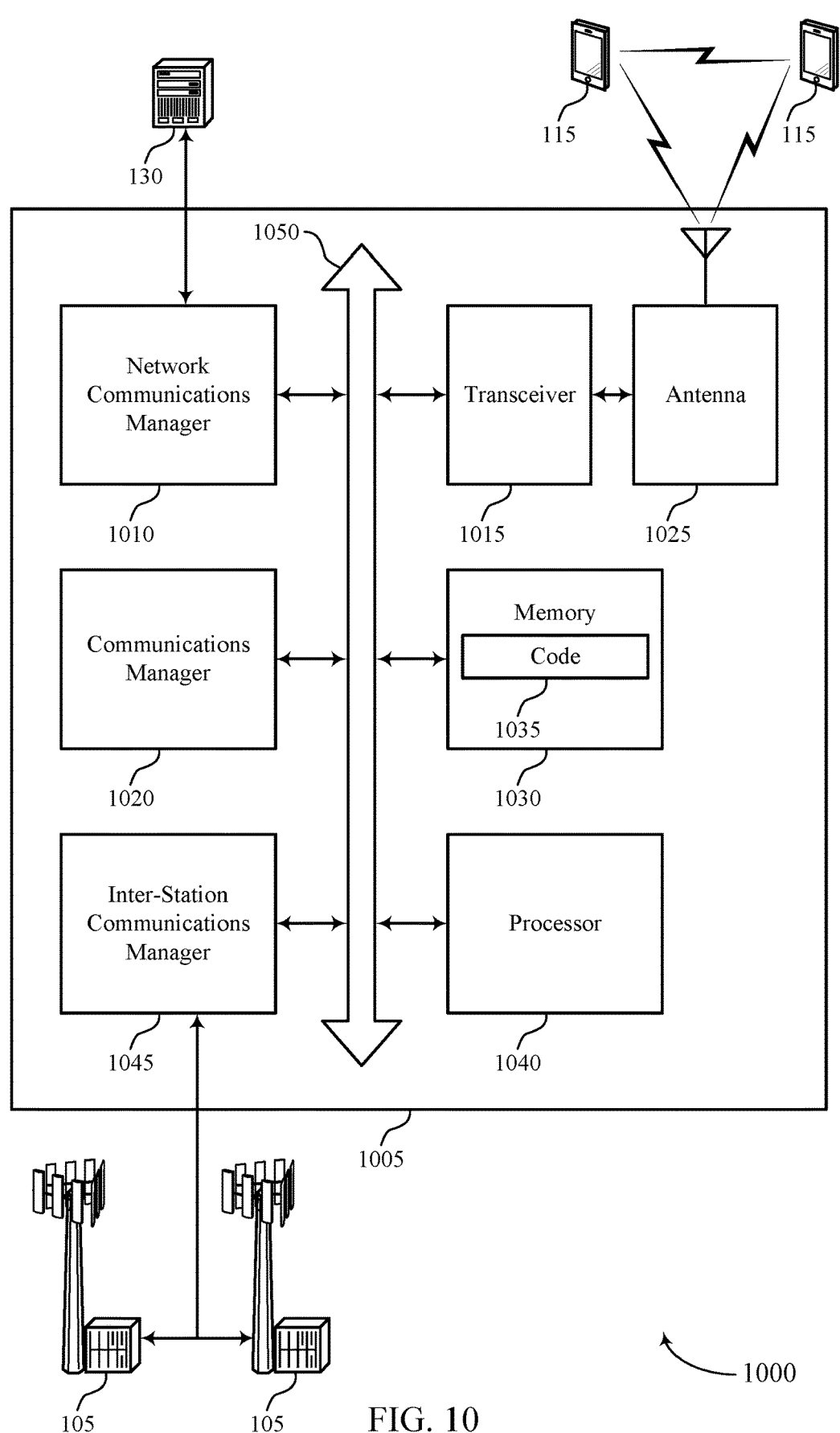
FIG. 10 shows a diagram of a system including a device that supports RAN node registration and discovery in accordance with aspects of the present disclosure.

FIG. 10 shows a diagram of a system 1000 including a device 1005 that supports RAN node registration and discovery in accordance with aspects of the present disclosure. The device 1005 may be an example of or include the components of a device 705, a device 805, or an AMF as described herein. The device 1005 may include components for bi-directional voice and data communications including components for transmitting and receiving communications, such as a communications manager 1020, a network communications manager 1010, a transceiver 1015, an antenna 1025, a memory 1030, code 1035, a processor 1040, and an inter-station communications manager 1045. These components may be in electronic communication or otherwise coupled (e.g., operatively, communicatively, functionally, electronically, electrically) via one or more buses (e.g., a bus 1050).

The network communications manager 1010 may manage communications with a core network 130 (e.g., via one or more wired backhaul links). For example, the network communications manager 1010 may manage the transfer of data communications for client devices, such as one or more UEs 115.

In some cases, the device 1005 may include a single antenna 1025. However, in some other cases the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random-access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a BIOS which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting RAN node registration and discovery). For example, the device 1005 or a component of the device 1005 may include a processor 1040 and memory 1030 coupled to the processor 1040, the processor 1040 and memory 1030 configured to perform various functions described herein.

The inter-station communications manager 1045 may manage communications with other base stations 105, and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, the inter-station communications manager 1045 may provide an X2 interface within an LTE/LTE-A wireless communications network technology to provide communication between base stations 105.

The communications manager 1020 may support wireless communications at an access and mobility management function in accordance with examples as disclosed herein. For example, the communications manager 1020 may be configured as or otherwise support a means for receiving a network entity setup request from a radio access network entity. The communications manager 1020 may be configured as or otherwise support a means for transmitting, to the radio access network entity and based on the network entity setup request, a setup response including a radio access network profile for the radio access network entity. The communications manager 1020 may be configured as or otherwise support a means for transmitting, to a network repository function and based on the network entity setup request, a radio access network registration message including the radio access network profile for the radio access network entity.

By including or configuring the communications manager 1020 in accordance with examples as described herein, the device 1005 may support techniques for improved communication reliability, reduced latency, improved user experience related to reduced processing, reduced power consumption, more efficient utilization of communication resources, improved coordination between devices, longer battery life, improved utilization of processing capability, or a combination thereof.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of RAN node registration and discovery as described herein, or the processor 1040 and the memory 1030 may be otherwise configured to perform or support such operations.

Figure 11:
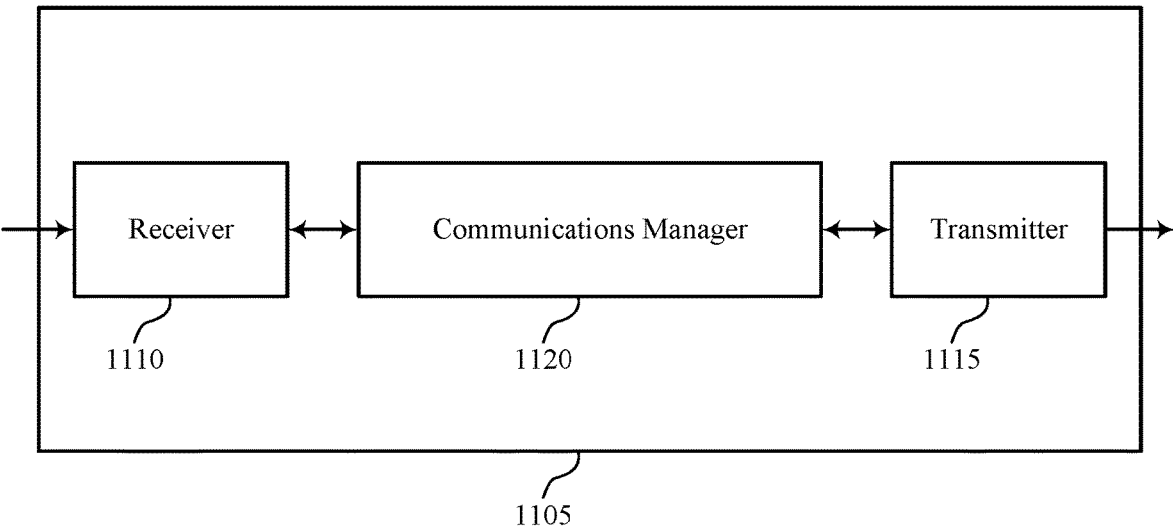
FIGS. 11 and 12 show block diagrams of devices that support RAN node registration and discovery in accordance with aspects of the present disclosure.

FIG. 11 shows a block diagram 1100 of a device 1105 that supports RAN node registration and discovery in accordance with aspects of the present disclosure. The device 1105 may be an example of aspects of an NWDAF as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to RAN node registration and discovery). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to RAN node registration and discovery). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of RAN node registration and discovery as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a network data analytics function in accordance with examples as disclosed herein. For example, the communications manager 1120 may be configured as or otherwise support a means for receiving an analytics request from a device, the analytics request including an indication of one or more target devices for analytics processing. The communications manager 1120 may be configured as or otherwise support a means for transmitting a query based on the analytics request, the query including a request for information identifying one or more radio access network entities associated with the one or more target devices. The communications manager 1120 may be configured as or otherwise support a means for receiving a response to the query including the information identifying the one or more radio access network entities associated with the one or more target devices. The communications manager 1120 may be configured as or otherwise support a means for transmitting a data collection request to a radio access network entity based on the response to the query, the one or more radio access network entities including at least the radio access network entity. The communications manager 1120 may be configured as or otherwise support a means for receiving, from the radio access network entity in response to the data collection request, a data collection response including analytics information associated with the one or more target devices.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced processing, reduced power consumption, more efficient utilization of communication resources, or a combination thereof.

Figure 12:
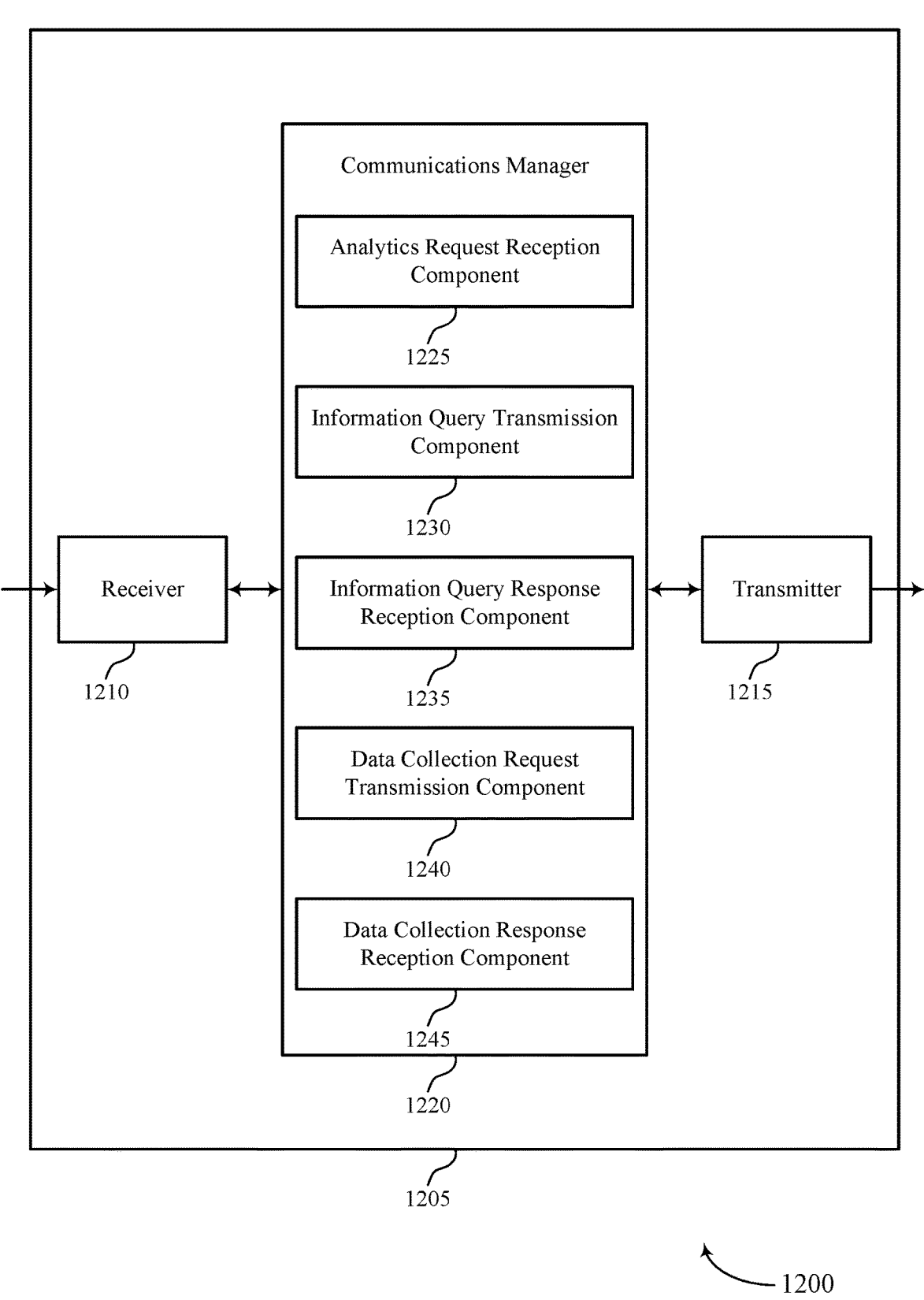

FIG. 12 shows a block diagram 1200 of a device 1205 that supports RAN node registration and discovery in accordance with aspects of the present disclosure. The device 1205 may be an example of aspects of a device 1105 or an NWDAF as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to RAN node registration and discovery). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to RAN node registration and discovery). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of RAN node registration and discovery as described herein. For example, the communications manager 1220 may include an analytics request reception component 1225, an information query transmission component 1230, an information query response reception component 1235, a data collection request transmission component 1240, a data collection response reception component 1245, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a network data analytics function in accordance with examples as disclosed herein. The analytics request reception component 1225 may be configured as or otherwise support a means for receiving an analytics request from a device, the analytics request including an indication of one or more target devices for analytics processing. The information query transmission component 1230 may be configured as or otherwise support a means for transmitting a query based on the analytics request, the query including a request for information identifying one or more radio access network entities associated with the one or more target devices. The information query response reception component 1235 may be configured as or otherwise support a means for receiving a response to the query including the information identifying the one or more radio access network entities associated with the one or more target devices. The data collection request transmission component 1240 may be configured as or otherwise support a means for transmitting a data collection request to a radio access network entity based on the response to the query, the one or more radio access network entities including at least the radio access network entity. The data collection response reception component 1245 may be configured as or otherwise support a means for receiving, from the radio access network entity in response to the data collection request, a data collection response including analytics information associated with the one or more target devices.

Figure 13:
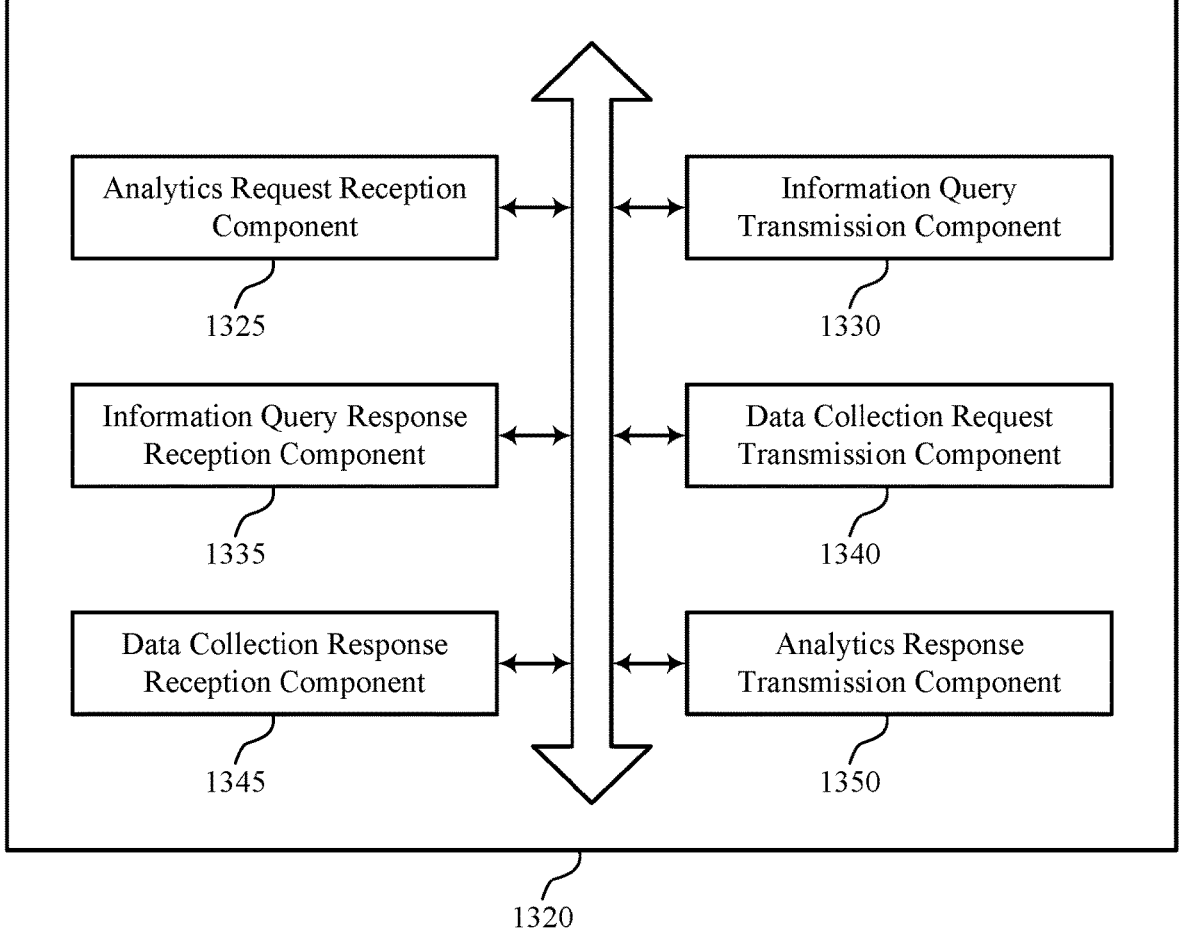
FIG. 13 shows a block diagram of a communications manager that supports RAN node registration and discovery in accordance with aspects of the present disclosure.

FIG. 13 shows a block diagram 1300 of a communications manager 1320 that supports RAN node registration and discovery in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of RAN node registration and discovery as described herein. For example, the communications manager 1320 may include an analytics request reception component 1325, an information query transmission component 1330, an information query response reception component 1335, a data collection request transmission component 1340, a data collection response reception component 1345, an analytics response transmission component 1350, or any combination thereof. Each of these components may communicate, directly or indirectly, with one another (e.g., via one or more buses).

The communications manager 1320 may support wireless communications at a network data analytics function in accordance with examples as disclosed herein. The analytics request reception component 1325 may be configured as or otherwise support a means for receiving an analytics request from a device, the analytics request including an indication of one or more target devices for analytics processing. The information query transmission component 1330 may be configured as or otherwise support a means for transmitting a query based on the analytics request, the query including a request for information identifying one or more radio access network entities associated with the one or more target devices. The information query response reception component 1335 may be configured as or otherwise support a means for receiving a response to the query including the information identifying the one or more radio access network entities associated with the one or more target devices. The data collection request transmission component 1340 may be configured as or otherwise support a means for transmitting a data collection request to a radio access network entity based on the response to the query, the one or more radio access network entities including at least the radio access network entity. The data collection response reception component 1345 may be configured as or otherwise support a means for receiving, from the radio access network entity in response to the data collection request, a data collection response including analytics information associated with the one or more target devices.

In some examples, the information query transmission component 1330 may be configured as or otherwise support a means for transmitting the query to a network repository function.

In some examples, the indication of one or more target devices includes an indication of one or more registration areas, an indication of one or more network slices, or both. In some examples, the request for information associated with the one or more target devices includes a request for information associated with the one or more registration areas, the one or more network slices, or both.

In some examples, the information query transmission component 1330 may be configured as or otherwise support a means for transmitting the query to a unified data management function.

In some examples, the indication of one or more target devices includes an indication of one or more network subscription identifiers, one or more identifiers for one or more groups of target devices, one or more user equipments (UEs), or any combination thereof. In some examples, the request for information associated with the one or more target devices includes a request for information associated with the one or more network subscription identifiers, the one or more identifiers for the one or more groups of target devices, the one or more UEs, or any combination thereof.

In some examples, the information identifying the one or more radio access network entities includes information identifying a radio access network entity that is associated with one of the one or more UEs.

In some examples, the information identifying the one or more radio access network entities includes a list of one or more radio access network entity identifiers.

In some examples, the device includes an access and mobility management function, a service management function, a policy control function, a second radio access network entity, a core network entity, an application function, an operations, administration and maintenance function, or any combination thereof.

In some examples, the analytics response transmission component 1350 may be configured as or otherwise support a means for transmitting, to the device and in response to receiving the analytics request, an analytics response including the analytics information associated with the one or more target devices.

In some examples, the analytics response transmission component 1350 may be configured as or otherwise support a means for determining one or more analytics results based on the analytics information, where the analytics response further includes the one or more analytics results.

Figure 14:
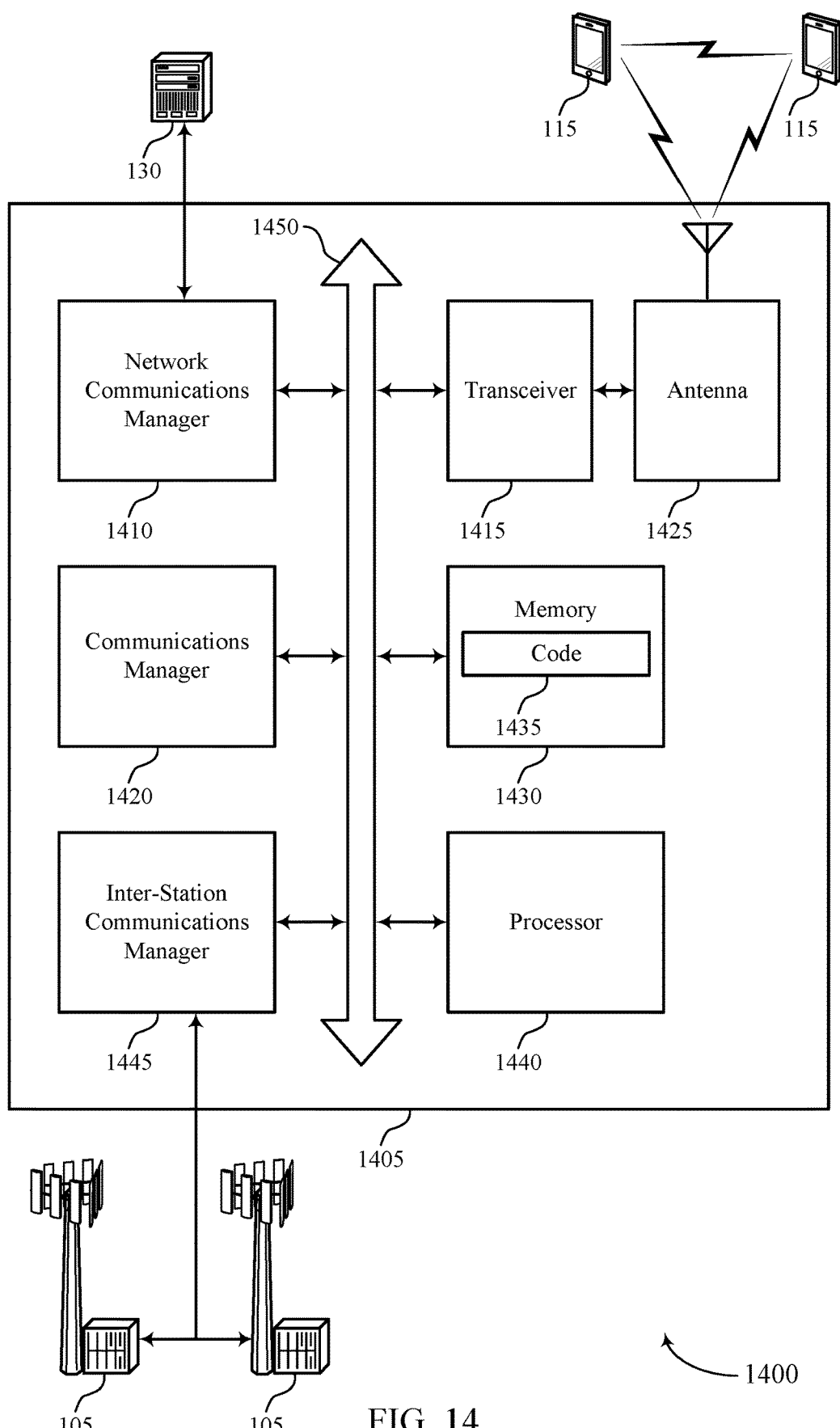
FIG. 14 shows a diagram of a system including a device that supports RAN node registration and discovery in accordance with aspects of the present disclosure.

FIG. 14 shows a diagram of a system 1400 including a device 1405 that supports RAN node registration and discovery in accordance with aspects of the present disclosure. The device 1405 may be an example of or include the components of a device 1105, a device 1205, or an NWDAF as described herein. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting RAN node registration and discovery). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at a network data analytics function in accordance with examples as disclosed herein. For example, the communications manager 1420 may be configured as or otherwise support a means for receiving an analytics request from a device, the analytics request including an indication of one or more target devices for analytics processing. The communications manager 1420 may be configured as or otherwise support a means for transmitting a query based on the analytics request, the query including a request for information identifying one or more radio access network entities associated with the one or more target devices. The communications manager 1420 may be configured as or otherwise support a means for receiving a response to the query including the information identifying the one or more radio access network entities associated with the one or more target devices. The communications manager 1420 may be configured as or otherwise support a means for transmitting a data collection request to a radio access network entity based on the response to the query, the one or more radio access network entities including at least the radio access network entity. The communications manager 1420 may be configured as or otherwise support a means for receiving, from the radio access network entity in response to the data collection request, a data collection response including analytics information associated with the one or more target devices.

By including or configuring the communications manager 1420 in accordance with examples as described herein, the device 1405 may support techniques for improved communication reliability, reduced latency, improved user experience related to reduced processing, reduced power consumption, more efficient utilization of communication resources, improved coordination between devices, longer battery life, improved utilization of processing capability, or a combination thereof.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of RAN node registration and discovery as described herein, or the processor 1440 and the memory 1430 may be otherwise configured to perform or support such operations.

Figure 15:
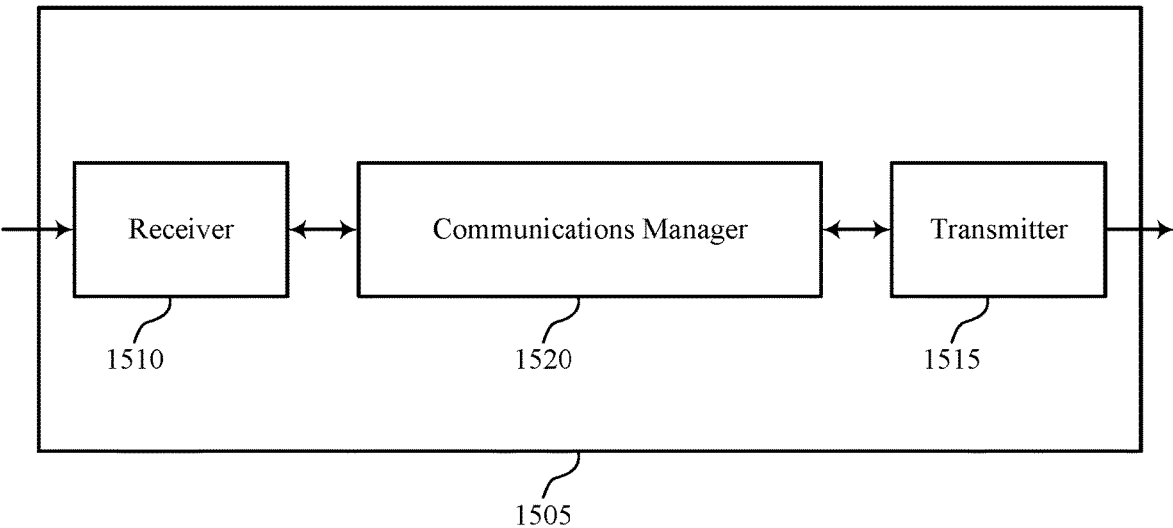
FIGS. 15 and 16 show block diagrams of devices that support RAN node registration and discovery in accordance with aspects of the present disclosure.

FIG. 15 shows a block diagram 1500 of a device 1505 that supports RAN node registration and discovery in accordance with aspects of the present disclosure. The device 1505 may be an example of aspects of a UDM as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to RAN node registration and discovery). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to RAN node registration and discovery). In some examples, the transmitter 1515 may be co-located with a receiver 1510 in a transceiver module. The transmitter 1515 may utilize a single antenna or a set of multiple antennas.

The communications manager 1520, the receiver 1510, the transmitter 1515, or various combinations thereof or various components thereof may be examples of means for performing various aspects of RAN node registration and discovery as described herein. For example, the communications manager 1520, the receiver 1510, the transmitter 1515, or various combinations or components thereof may support a method for performing one or more of the functions described herein.

In some examples, the communications manager 1520, the receiver 1510, the transmitter 1515, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1520, the receiver 1510, the transmitter 1515, or various combinations or components thereof may be implemented in code (e.g., as communications management software or firmware) executed by a processor. If implemented in code executed by a processor, the functions of the communications manager 1520, the receiver 1510, the transmitter 1515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1520 may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communications at a unified data management function in accordance with examples as disclosed herein. For example, the communications manager 1520 may be configured as or otherwise support a means for receiving, from an access and mobility management function, radio access network information associated with a set of radio access network entities. The communications manager 1520 may be configured as or otherwise support a means for storing, at the unified data management function, the radio access network information associated with the set of radio access network entities. The communications manager 1520 may be configured as or otherwise support a means for receiving, from a network data analytics function, a query for information associated with one or more target devices for analytics processing. The communications manager 1520 may be configured as or otherwise support a means for identifying, in response to the query, one or more radio access network entities of the set of radio access network entities based on the one or more target devices, the stored radio access network information, or any combination thereof. The communications manager 1520 may be configured as or otherwise support a means for transmitting, to the network data analytics function, a response to the query including an indication of the identified one or more radio access network entities.

By including or configuring the communications manager 1520 in accordance with examples as described herein, the device 1505 (e.g., a processor controlling or otherwise coupled to the receiver 1510, the transmitter 1515, the communications manager 1520, or a combination thereof) may support techniques for reduced processing, reduced power consumption, more efficient utilization of communication resources, or a combination thereof.

Figure 16:
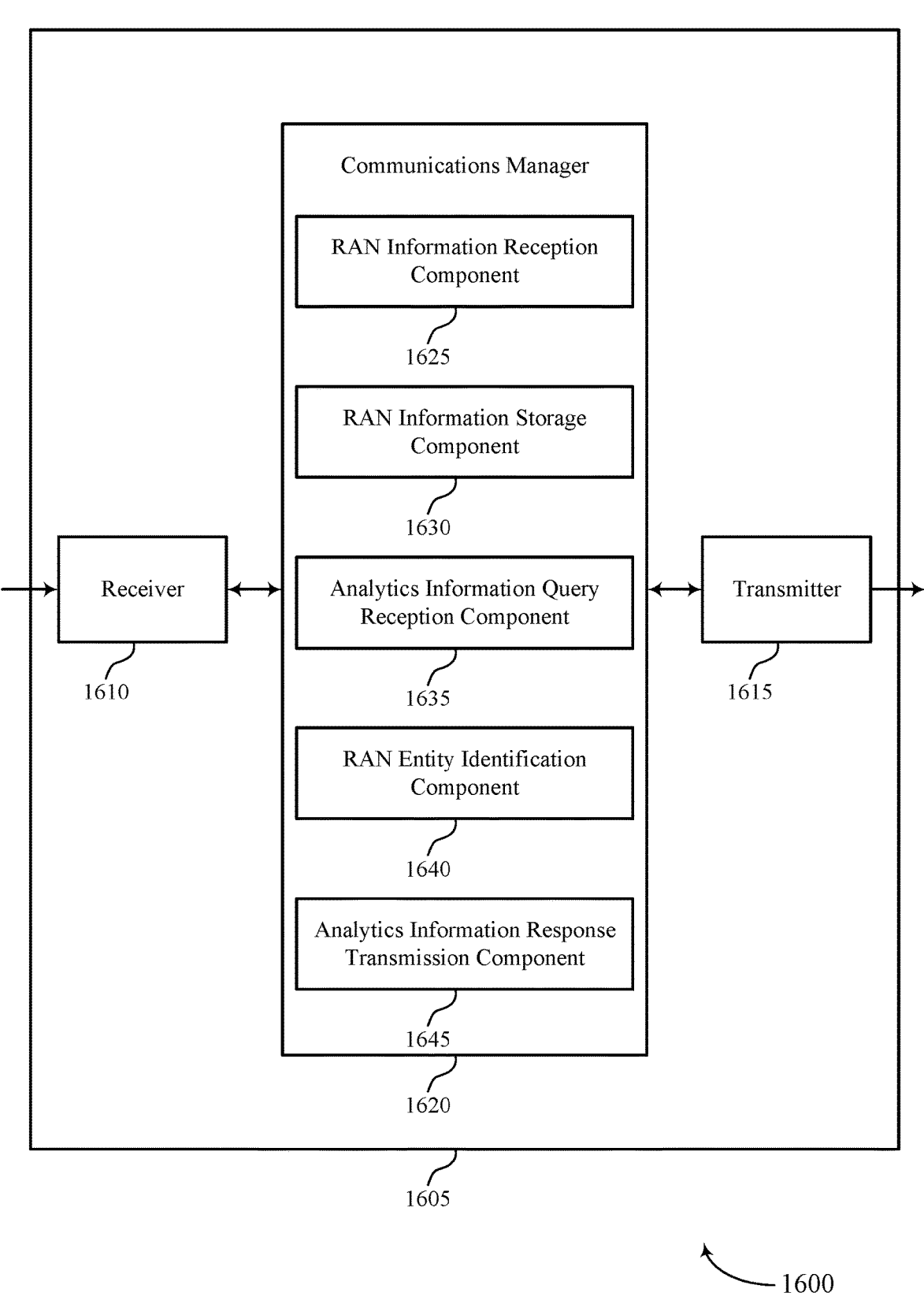

FIG. 16 shows a block diagram 1600 of a device 1605 that supports RAN node registration and discovery in accordance with aspects of the present disclosure. The device 1605 may be an example of aspects of a device 1505 or a UDM as described herein. The device 1605 may include a receiver 1610, a transmitter 1615, and a communications manager 1620. The device 1605 may also include a processor. Each of these components may be in communication with one another (e.g., via one or more buses).

The receiver 1610 may provide a means for receiving information such as packets, user data, control information, or any combination thereof associated with various information channels (e.g., control channels, data channels, information channels related to RAN node registration and discovery). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to RAN node registration and discovery). In some examples, the transmitter 1615 may be co-located with a receiver 1610 in a transceiver module. The transmitter 1615 may utilize a single antenna or a set of multiple antennas.

The device 1605, or various components thereof, may be an example of means for performing various aspects of RAN node registration and discovery as described herein. For example, the communications manager 1620 may include a RAN information reception component 1625, a RAN information storage component 1630, an analytics information query reception component 1635, a RAN entity identification component 1640, an analytics information response transmission component 1645, or any combination thereof. The communications manager 1620 may be an example of aspects of a communications manager 1520 as described herein. In some examples, the communications manager 1620, or various components thereof, may be configured to perform various operations (e.g., receiving, monitoring, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to receive information, transmit information, or perform various other operations as described herein.

The communications manager 1620 may support wireless communications at a unified data management function in accordance with examples as disclosed herein. The RAN information reception component 1625 may be configured as or otherwise support a means for receiving, from an access and mobility management function, radio access network information associated with a set of radio access network entities. The RAN information storage component 1630 may be configured as or otherwise support a means for storing, at the unified data management function, the radio access network information associated with the set of radio access network entities. The analytics information query reception component 1635 may be configured as or otherwise support a means for receiving, from a network data analytics function, a query for information associated with one or more target devices for analytics processing. The RAN entity identification component 1640 may be configured as or otherwise support a means for identifying, in response to the query, one or more radio access network entities of the set of radio access network entities based on the one or more target devices, the stored radio access network information, or any combination thereof. The analytics information response transmission component 1645 may be configured as or otherwise support a means for transmitting, to the network data analytics function, a response to the query including an indication of the identified one or more radio access network entities.

Figure 17:
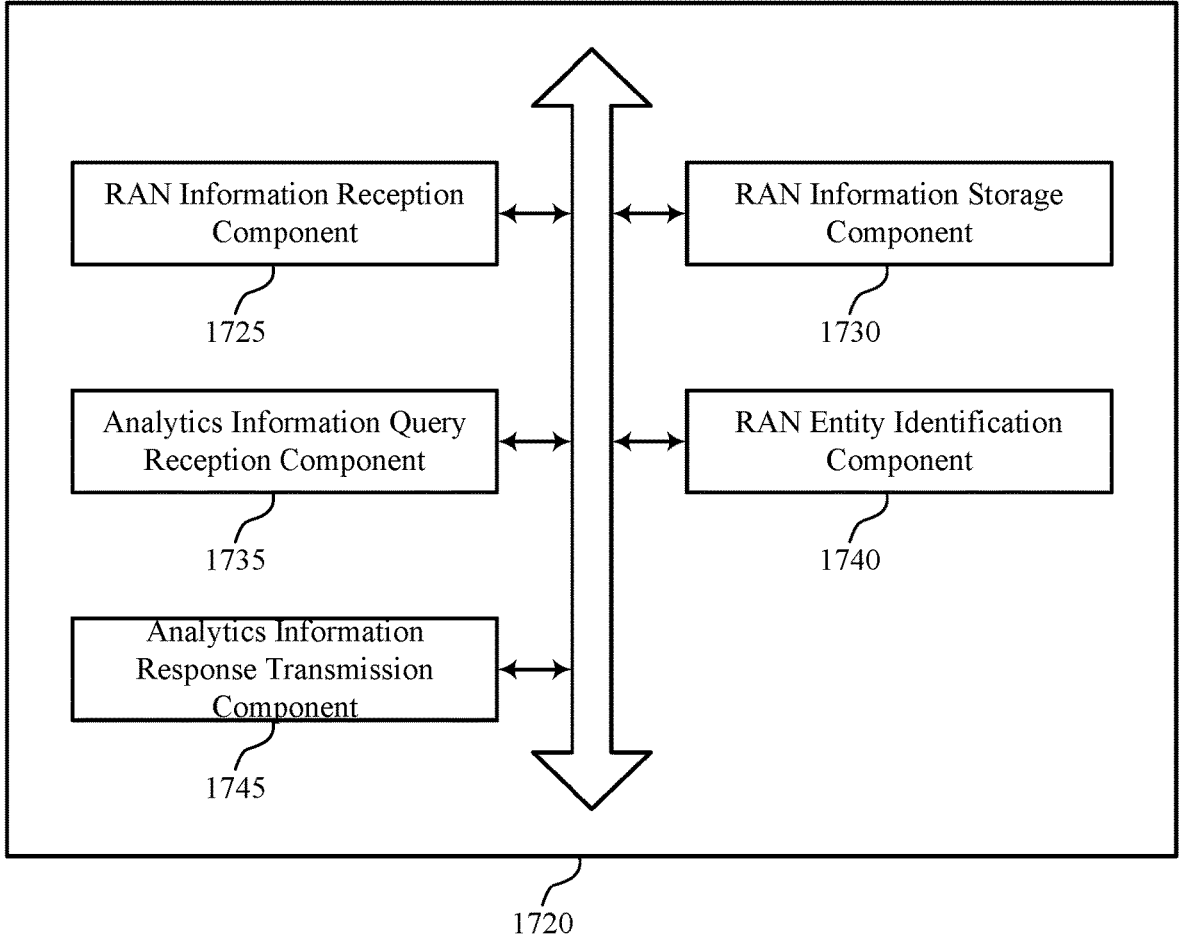
FIG. 17 shows a block diagram of a communications manager that supports RAN node registration and discovery in accordance with aspects of the present disclosure.

FIG. 17 shows a block diagram 1700 of a communications manager 1720 that supports RAN node registration and discovery in accordance with aspects of the present disclosure. The communications manager 1720 may be an example of aspects of a communications manager 1520, a communications manager 1620, or both, as described herein. The communications manager 1720, or various components thereof, may be an example of means for performing various aspects of RAN node registration and discovery as described herein. For example, the communications manager 1720 may include a RAN information reception component 1725, a RAN information storage component 1730, an analytics information query reception component 1735, a RAN entity identification component 1740, an analytics information response transmission component 1745, or any combination thereof. Each of these components may communicate, directly or indirectly, with one another (e.g., via one or more buses).

The communications manager 1720 may support wireless communications at a unified data management function in accordance with examples as disclosed herein. The RAN information reception component 1725 may be configured as or otherwise support a means for receiving, from an access and mobility management function, radio access network information associated with a set of radio access network entities. The RAN information storage component 1730 may be configured as or otherwise support a means for storing, at the unified data management function, the radio access network information associated with the set of radio access network entities. The analytics information query reception component 1735 may be configured as or otherwise support a means for receiving, from a network data analytics function, a query for information associated with one or more target devices for analytics processing. The RAN entity identification component 1740 may be configured as or otherwise support a means for identifying, in response to the query, one or more radio access network entities of the set of radio access network entities based on the one or more target devices, the stored radio access network information, or any combination thereof. The analytics information response transmission component 1745 may be configured as or otherwise support a means for transmitting, to the network data analytics function, a response to the query including an indication of the identified one or more radio access network entities.

In some examples, the radio access network information includes a radio access network entity identifier, a radio access network entity name, or both.

In some examples, the radio access network information is received as part of a registration area update procedure.

In some examples, the query further includes a request for information associated with one or more network subscription identifiers, one or more identifiers for one or more groups of target devices, one or more user equipments (UEs) or any combination thereof. In some examples, identifying the one or more radio access network entities of the set of radio access network entities is based on the one or more network subscription identifiers, the one or more identifiers for the one or more groups of target devices, the one or more UEs, or any combination thereof.

In some examples, the indication of the identified one or more radio access network entities includes a radio access network entity identifier associated with a radio access network entity that is associated with one of the one or more UEs.

In some examples, the indication of the identified one or more radio access network entities includes a list of one or more radio access network entity identifiers.

Figure 18:
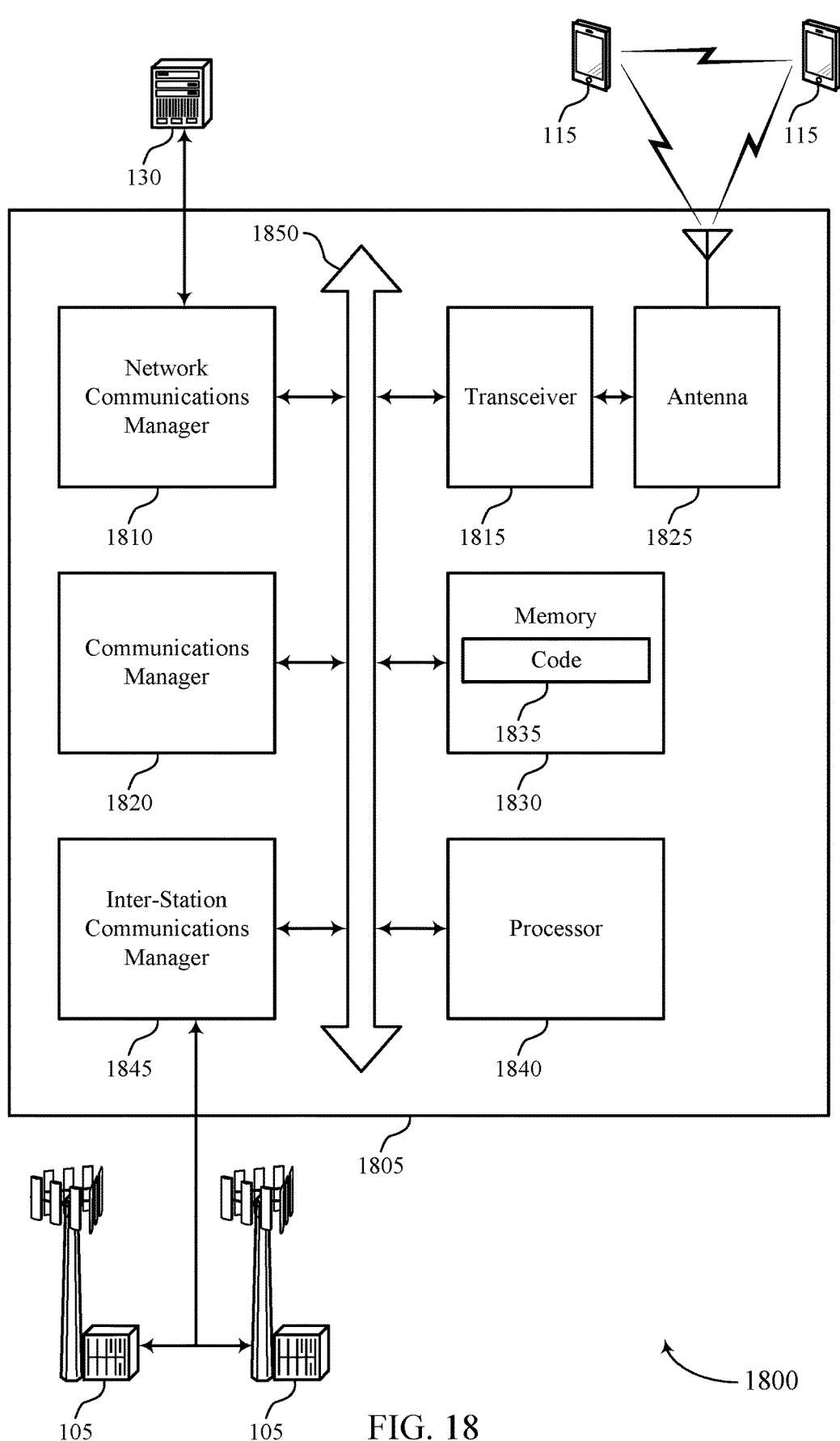
FIG. 18 shows a diagram of a system including a device that supports RAN node registration and discovery in accordance with aspects of the present disclosure.

FIG. 18 shows a diagram of a system 1800 including a device 1805 that supports RAN node registration and discovery in accordance with aspects of the present disclosure. The device 1805 may be an example of or include the components of a device 1505, a device 1605, or a UDM as described herein. The device 1805 may include components for bi-directional voice and data communications including components for transmitting and receiving communications, such as a communications manager 1820, a network communications manager 1810, a transceiver 1815, an antenna 1825, a memory 1830, code 1835, a processor 1840, and an inter-station communications manager 1845. These components may be in electronic communication or otherwise coupled (e.g., operatively, communicatively, functionally, electronically, electrically) via one or more buses (e.g., a bus 1850).

The network communications manager 1810 may manage communications with a core network 130 (e.g., via one or more wired backhaul links). For example, the network communications manager 1810 may manage the transfer of data communications for client devices, such as one or more UEs 115.

In some cases, the device 1805 may include a single antenna 1825. However, in some other cases the device 1805 may have more than one antenna 1825, which may be capable of concurrently transmitting or receiving multiple wireless transmissions. The transceiver 1815 may communicate bi-directionally, via the one or more antennas 1825, wired, or wireless links as described herein. For example, the transceiver 1815 may represent a wireless transceiver and may communicate bi-directionally with another wireless transceiver. The transceiver 1815 may also include a modem to modulate the packets, to provide the modulated packets to one or more antennas 1825 for transmission, and to demodulate packets received from the one or more antennas 1825. The transceiver 1815, or the transceiver 1815 and one or more antennas 1825, may be an example of a transmitter 1515, a transmitter 1615, a receiver 1510, a receiver 1610, or any combination thereof or component thereof, as described herein.

The memory 1830 may include RAM and ROM. The memory 1830 may store computer-readable, computer-executable code 1835 including instructions that, when executed by the processor 1840, cause the device 1805 to perform various functions described herein. The code 1835 may be stored in a non-transitory computer-readable medium such as system memory or another type of memory.

In some cases, the code 1835 may not be directly executable by the processor 1840 but may cause a computer (e.g., when compiled and executed) to perform functions described herein. In some cases, the memory 1830 may contain, among other things, a BIOS which may control basic hardware or software operation such as the interaction with peripheral components or devices.

The processor 1840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some other cases, a memory controller may be integrated into the processor 1840. The processor 1840 may be configured to execute computer-readable instructions stored in a memory (e.g., the memory 1830) to cause the device 1805 to perform various functions (e.g., functions or tasks supporting RAN node registration and discovery). For example, the device 1805 or a component of the device 1805 may include a processor 1840 and memory 1830 coupled to the processor 1840, the processor 1840 and memory 1830 configured to perform various functions described herein.

The inter-station communications manager 1845 may manage communications with other base stations 105, and may include a controller or scheduler for controlling communications with UEs 115 in cooperation with other base stations 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communications network technology to provide communication between base stations 105.

The communications manager 1820 may support wireless communications at a unified data management function in accordance with examples as disclosed herein. For example, the communications manager 1820 may be configured as or otherwise support a means for receiving, from an access and mobility management function, radio access network information associated with a set of radio access network entities. The communications manager 1820 may be configured as or otherwise support a means for storing, at the unified data management function, the radio access network information associated with the set of radio access network entities. The communications manager 1820 may be configured as or otherwise support a means for receiving, from a network data analytics function, a query for information associated with one or more target devices for analytics processing. The communications manager 1820 may be configured as or otherwise support a means for identifying, in response to the query, one or more radio access network entities of the set of radio access network entities based on the one or more target devices, the stored radio access network information, or any combination thereof. The communications manager 1820 may be configured as or otherwise support a means for transmitting, to the network data analytics function, a response to the query including an indication of the identified one or more radio access network entities.

By including or configuring the communications manager 1820 in accordance with examples as described herein, the device 1805 may support techniques for improved communication reliability, reduced latency, improved user experience related to reduced processing, reduced power consumption, more efficient utilization of communication resources, improved coordination between devices, longer battery life, improved utilization of processing capability, or a combination thereof.

In some examples, the communications manager 1820 may be configured to perform various operations (e.g., receiving, monitoring, transmitting) using or otherwise in cooperation with the transceiver 1815, the one or more antennas 1825, or any combination thereof. Although the communications manager 1820 is illustrated as a separate component, in some examples, one or more functions described with reference to the communications manager 1820 may be supported by or performed by the processor 1840, the memory 1830, the code 1835, or any combination thereof. For example, the code 1835 may include instructions executable by the processor 1840 to cause the device 1805 to perform various aspects of RAN node registration and discovery as described herein, or the processor 1840 and the memory 1830 may be otherwise configured to perform or support such operations.

Figure 19:
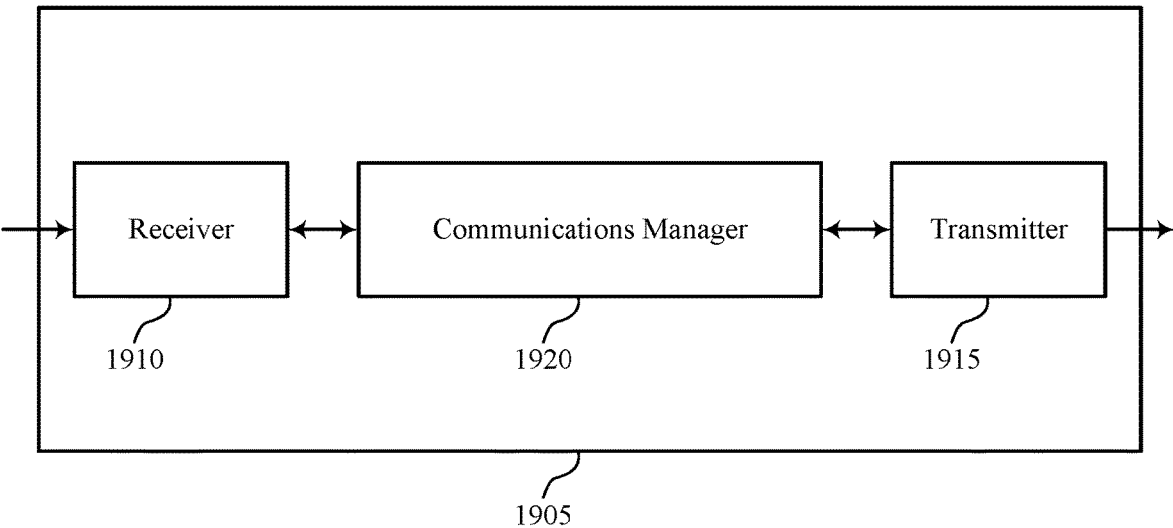
FIGS. 19 and 20 show block diagrams of devices that support RAN node registration and discovery in accordance with aspects of the present disclosure.

FIG. 19 shows a block diagram 1900 of a device 1905 that supports RAN node registration and discovery in accordance with aspects of the present disclosure. The device 1905 may be an example of aspects of an NRF as described herein. The device 1905 may include a receiver 1910, a transmitter 1915, and a communications manager 1920. The device 1905 may also include a processor. Each of these components may be in communication with one another (e.g., via one or more buses).

The receiver 1910 may provide a means for receiving information such as packets, user data, control information, or any combination thereof associated with various information channels (e.g., control channels, data channels, information channels related to RAN node registration and discovery). Information may be passed on to other components of the device 1905. The receiver 1910 may utilize a single antenna or a set of multiple antennas.

The transmitter 1915 may provide a means for transmitting signals generated by other components of the device 1905. For example, the transmitter 1915 may transmit information such as packets, user data, control information, or any combination thereof associated with various information channels (e.g., control channels, data channels, information channels related to RAN node registration and discovery). In some examples, the transmitter 1915 may be co-located with a receiver 1910 in a transceiver module. The transmitter 1915 may utilize a single antenna or a set of multiple antennas.

The communications manager 1920, the receiver 1910, the transmitter 1915, or various combinations thereof or various components thereof may be examples of means for performing various aspects of RAN node registration and discovery as described herein. For example, the communications manager 1920, the receiver 1910, the transmitter 1915, or various combinations or components thereof may support a method for performing one or more of the functions described herein.

In some examples, the communications manager 1920, the receiver 1910, the transmitter 1915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1920, the receiver 1910, the transmitter 1915, or various combinations or components thereof may be implemented in code (e.g., as communications management software or firmware) executed by a processor. If implemented in code executed by a processor, the functions of the communications manager 1920, the receiver 1910, the transmitter 1915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1920 may be configured to perform various operations (e.g., receiving, monitoring, transmitting) using or otherwise in cooperation with the receiver 1910, the transmitter 1915, or both. For example, the communications manager 1920 may receive information from the receiver 1910, send information to the transmitter 1915, or be integrated in combination with the receiver 1910, the transmitter 1915, or both to receive information, transmit information, or perform various other operations as described herein.

The communications manager 1920 may support wireless communications at a network repository function in accordance with examples as disclosed herein. For example, the communications manager 1920 may be configured as or otherwise support a means for receiving, from an access and mobility management function, a set of radio access network profiles for a set of radio access network entities. The communications manager 1920 may be configured as or otherwise support a means for registering the set of radio access network profiles at the network repository function. The communications manager 1920 may be configured as or otherwise support a means for receiving, from a network data analytics function, a query for information identifying one or more radio access network entities associated with one or more target devices for analytics processing. The communications manager 1920 may be configured as or otherwise support a means for identifying, in response to the query, one or more radio access network entities of the set of radio access network entities based on the one or more target devices, the set of radio access network profiles, or any combination thereof. The communications manager 1920 may be configured as or otherwise support a means for transmitting, to the network data analytics function, a response to the query including an indication of the identified one or more radio access network entities.

By including or configuring the communications manager 1920 in accordance with examples as described herein, the device 1905 (e.g., a processor controlling or otherwise coupled to the receiver 1910, the transmitter 1915, the communications manager 1920, or a combination thereof) may support techniques for reduced processing, reduced power consumption, more efficient utilization of communication resources, or a combination thereof.

Figure 20:
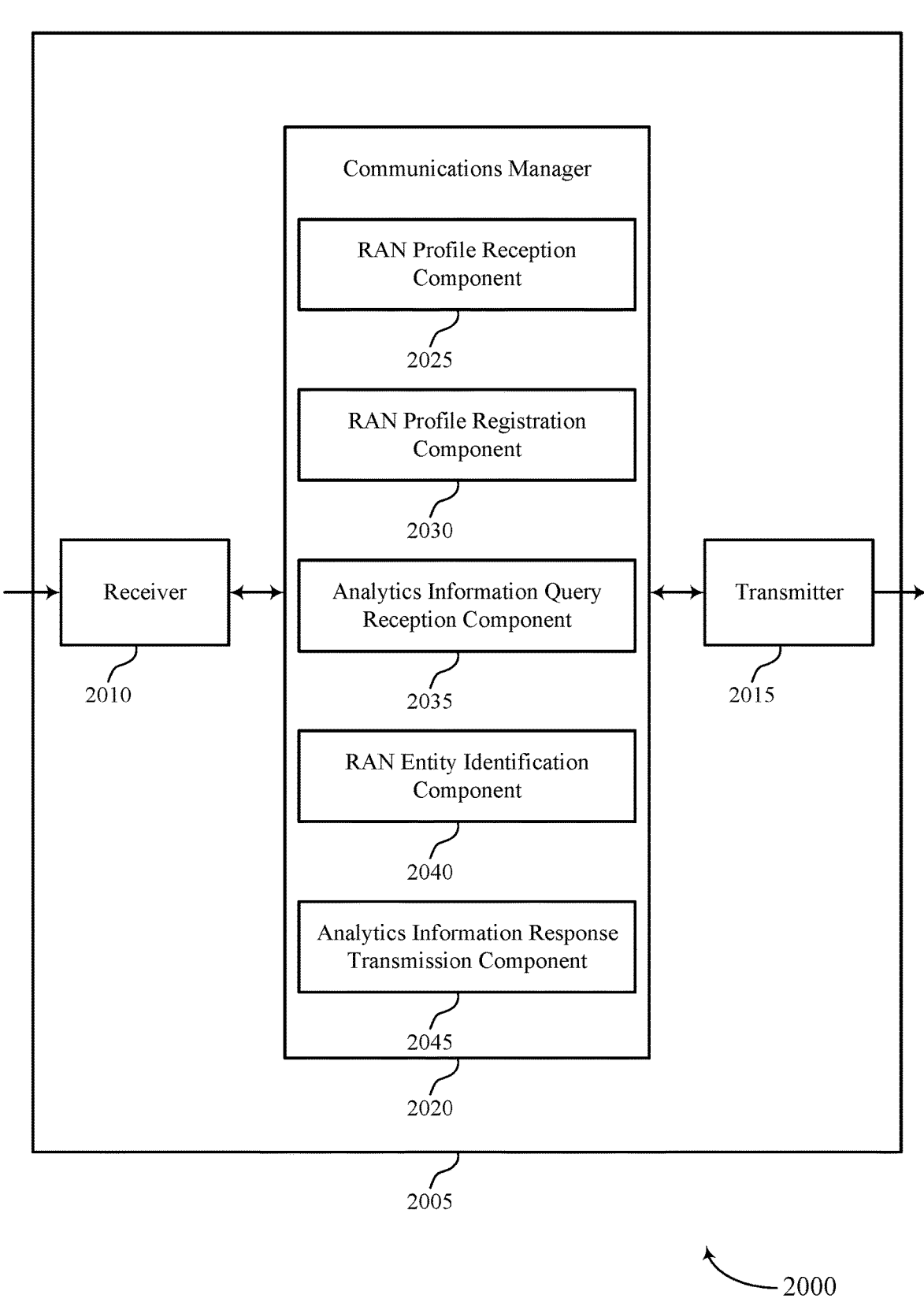

FIG. 20 shows a block diagram 2000 of a device 2005 that supports RAN node registration and discovery in accordance with aspects of the present disclosure. The device 2005 may be an example of aspects of a device 1905 or an NRF as described herein. The device 2005 may include a receiver 2010, a transmitter 2015, and a communications manager 2020. The device 2005 may also include a processor. Each of these components may be in communication with one another (e.g., via one or more buses).

The receiver 2010 may provide a means for receiving information such as packets, user data, control information, or any combination thereof associated with various information channels (e.g., control channels, data channels, information channels related to RAN node registration and discovery). Information may be passed on to other components of the device 2005. The receiver 2010 may utilize a single antenna or a set of multiple antennas.

The transmitter 2015 may provide a means for transmitting signals generated by other components of the device 2005. For example, the transmitter 2015 may transmit information such as packets, user data, control information, or any combination thereof associated with various information channels (e.g., control channels, data channels, information channels related to RAN node registration and discovery). In some examples, the transmitter 2015 may be co-located with a receiver 2010 in a transceiver module. The transmitter 2015 may utilize a single antenna or a set of multiple antennas.

The device 2005, or various components thereof, may be an example of means for performing various aspects of RAN node registration and discovery as described herein. For example, the communications manager 2020 may include a RAN profile reception component 2025, a RAN profile registration component 2030, an analytics information query reception component 2035, a RAN entity identification component 2040, an analytics information response transmission component 2045, or any combination thereof. The communications manager 2020 may be an example of aspects of a communications manager 1920 as described herein. In some examples, the communications manager 2020, or various components thereof, may be configured to perform various operations (e.g., receiving, monitoring, transmitting) using or otherwise in cooperation with the receiver 2010, the transmitter 2015, or both. For example, the communications manager 2020 may receive information from the receiver 2010, send information to the transmitter 2015, or be integrated in combination with the receiver 2010, the transmitter 2015, or both to receive information, transmit information, or perform various other operations as described herein.

The communications manager 2020 may support wireless communications at a network repository function in accordance with examples as disclosed herein. The RAN profile reception component 2025 may be configured as or otherwise support a means for receiving, from an access and mobility management function, a set of radio access network profiles for a set of radio access network entities. The RAN profile registration component 2030 may be configured as or otherwise support a means for registering the set of radio access network profiles at the network repository function. The analytics information query reception component 2035 may be configured as or otherwise support a means for receiving, from a network data analytics function, a query for information identifying one or more radio access network entities associated with one or more target devices for analytics processing. The RAN entity identification component 2040 may be configured as or otherwise support a means for identifying, in response to the query, one or more radio access network entities of the set of radio access network entities based on the one or more target devices, the set of radio access network profiles, or any combination thereof. The analytics information response transmission component 2045 may be configured as or otherwise support a means for transmitting, to the network data analytics function, a response to the query including an indication of the identified one or more radio access network entities.

Figure 21:
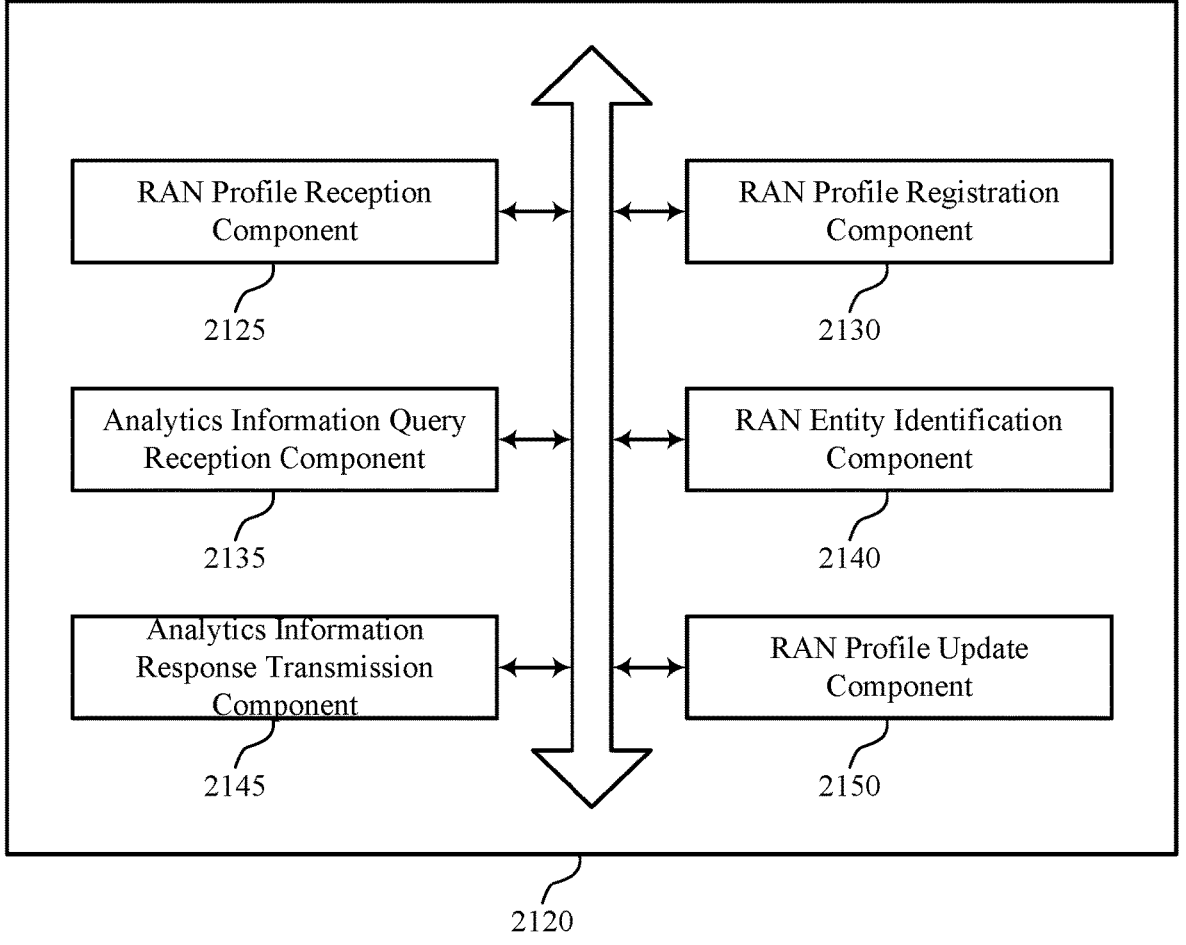
FIG. 21 shows a block diagram of a communications manager that supports RAN node registration and discovery in accordance with aspects of the present disclosure.

FIG. 21 shows a block diagram 2100 of a communications manager 2120 that supports RAN node registration and discovery in accordance with aspects of the present disclosure. The communications manager 2120 may be an example of aspects of a communications manager 1920, a communications manager 2020, or both, as described herein. The communications manager 2120, or various components thereof, may be an example of means for performing various aspects of RAN node registration and discovery as described herein. For example, the communications manager 2120 may include a RAN profile reception component 2125, a RAN profile registration component 2130, an analytics information query reception component 2135, a RAN entity identification component 2140, an analytics information response transmission component 2145, a RAN profile update component 2150, or any combination thereof. Each of these components may communicate, directly or indirectly, with one another (e.g., via one or more buses).

The communications manager 2120 may support wireless communications at a network repository function in accordance with examples as disclosed herein. The RAN profile reception component 2125 may be configured as or otherwise support a means for receiving, from an access and mobility management function, a set of radio access network profiles for a set of radio access network entities. The RAN profile registration component 2130 may be configured as or otherwise support a means for registering the set of radio access network profiles at the network repository function. The analytics information query reception component 2135 may be configured as or otherwise support a means for receiving, from a network data analytics function, a query for information identifying one or more radio access network entities associated with one or more target devices for analytics processing. The RAN entity identification component 2140 may be configured as or otherwise support a means for identifying, in response to the query, one or more radio access network entities of the set of radio access network entities based on the one or more target devices, the set of radio access network profiles, or any combination thereof. The analytics information response transmission component 2145 may be configured as or otherwise support a means for transmitting, to the network data analytics function, a response to the query including an indication of the identified one or more radio access network entities.

In some examples, the RAN profile reception component 2125 may be configured as or otherwise support a means for receiving an updated radio access network profile including an update flag. In some examples, the RAN profile update component 2150 may be configured as or otherwise support a means for updating a radio access network profile of the set of radio access network profiles based on the updated radio access network profile. In some examples, the RAN profile update component 2150 may be configured as or otherwise support a means for transmitting a confirmation message indicating that the radio access network profile of the set of radio access network profiles has been updated.

In some examples, the updated radio access network profile includes a radio access network entity identifier, a radio access network entity name, or both.

In some examples, each radio access network profile of the set of radio access network profiles includes a radio access network entity identifier, a radio access network entity name, one or more supported registration areas, network slicing information, or any combination thereof.

In some examples, the RAN profile registration component 2130 may be configured as or otherwise support a means for transmitting, to the access and mobility management function, a confirmation message indicating that the set of radio access network profiles has been registered at the network repository function.

In some examples, the query further includes a request for information associated with one or more registration areas, one or more network slices, or both. In some examples, identifying the one or more radio access network entities is based on the one or more registration areas, the one or more network slices, or both.

In some examples, the indication of the identified one or more radio access network entities includes a list of one or more radio access network entity identifiers.

Figure 22:
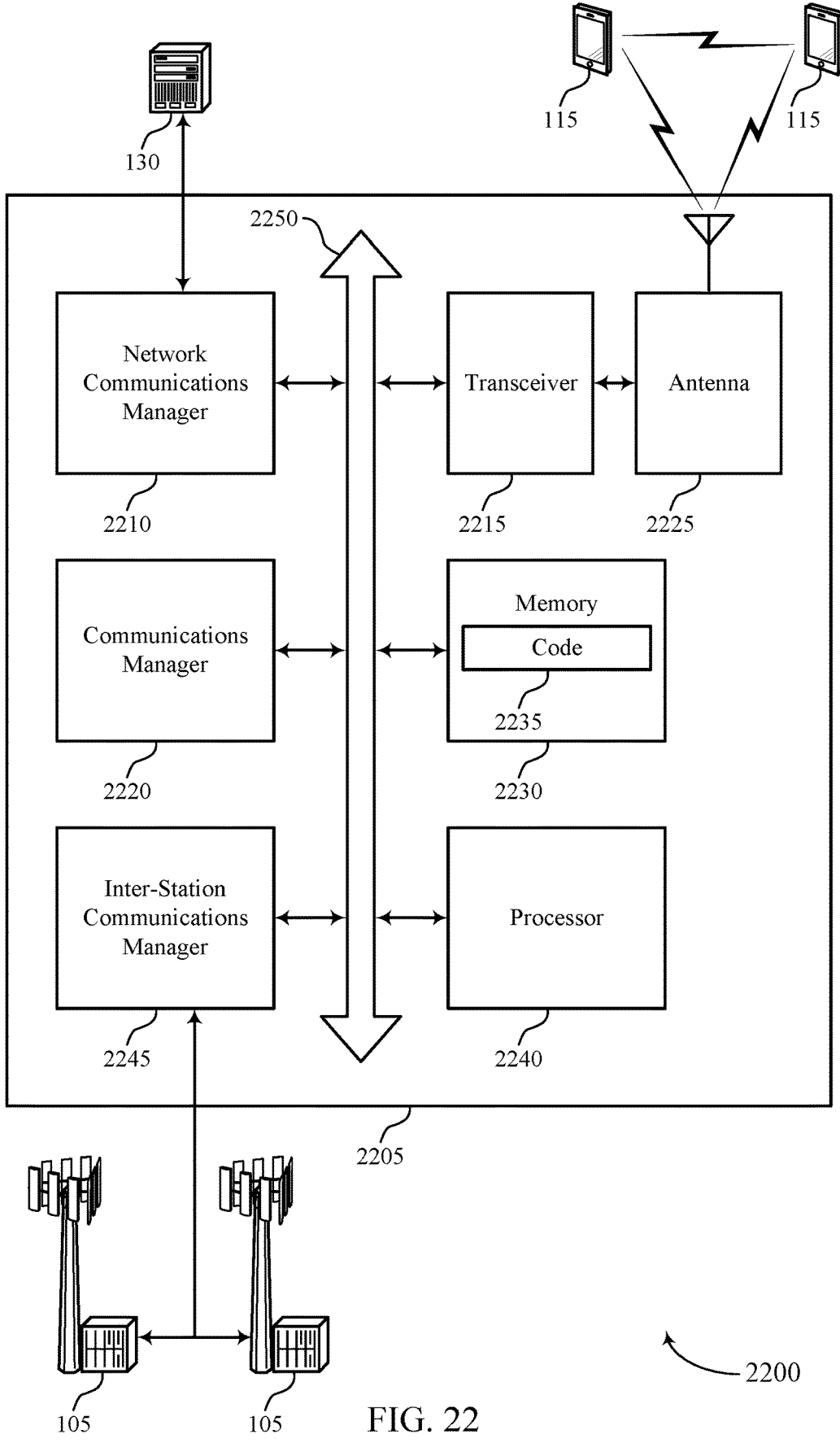
FIG. 22 shows a diagram of a system including a device that supports RAN node registration and discovery in accordance with aspects of the present disclosure.

FIG. 22 shows a diagram of a system 2200 including a device 2205 that supports RAN node registration and discovery in accordance with aspects of the present disclosure. The device 2205 may be an example of or include the components of a device 1905, a device 2005, or an NRF as described herein. The device 2205 may include components for bi-directional voice and data communications including components for transmitting and receiving communications, such as a communications manager 2220, a network communications manager 2210, a transceiver 2215, an antenna 2225, a memory 2230, code 2235, a processor 2240, and an inter-station communications manager 2245. These components may be in electronic communication or otherwise coupled (e.g., operatively, communicatively, functionally, electronically, electrically) via one or more buses (e.g., a bus 2250).

The network communications manager 2210 may manage communications with a core network 130 (e.g., via one or more wired backhaul links). For example, the network communications manager 2210 may manage the transfer of data communications for client devices, such as one or more UEs 115.

In some cases, the device 2205 may include a single antenna 2225. However, in some other cases the device 2205 may have more than one antenna 2225, which may be capable of concurrently transmitting or receiving multiple wireless transmissions. The transceiver 2215 may communicate bi-directionally, via the one or more antennas 2225, wired, or wireless links as described herein. For example, the transceiver 2215 may represent a wireless transceiver and may communicate bi-directionally with another wireless transceiver. The transceiver 2215 may also include a modem to modulate the packets, to provide the modulated packets to one or more antennas 2225 for transmission, and to demodulate packets received from the one or more antennas 2225. The transceiver 2215, or the transceiver 2215 and one or more antennas 2225, may be an example of a transmitter 1915, a transmitter 2015, a receiver 1910, a receiver 2010, or any combination thereof or component thereof, as described herein.

The memory 2230 may include RAM and ROM. The memory 2230 may store computer-readable, computer-executable code 2235 including instructions that, when executed by the processor 2240, cause the device 2205 to perform various functions described herein. The code 2235 may be stored in a non-transitory computer-readable medium such as system memory or another type of memory. In some cases, the code 2235 may not be directly executable by the processor 2240 but may cause a computer (e.g., when compiled and executed) to perform functions described herein. In some cases, the memory 2230 may contain, among other things, a BIOS which may control basic hardware or software operation such as the interaction with peripheral components or devices.

The processor 2240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2240 may be configured to operate a memory array using a memory controller. In some other cases, a memory controller may be integrated into the processor 2240. The processor 2240 may be configured to execute computer-readable instructions stored in a memory (e.g., the memory 2230) to cause the device 2205 to perform various functions (e.g., functions or tasks supporting RAN node registration and discovery). For example, the device 2205 or a component of the device 2205 may include a processor 2240 and memory 2230 coupled to the processor 2240, the processor 2240 and memory 2230 configured to perform various functions described herein.

The inter-station communications manager 2245 may manage communications with other base stations 105, and may include a controller or scheduler for controlling communications with UEs 115 in cooperation with other base stations 105. For example, the inter-station communications manager 2245 may coordinate scheduling for transmissions to UEs 115 for various interference mitigation techniques such as beamforming or joint transmission. In some examples, the inter-station communications manager 2245 may provide an X2 interface within an LTE/LTE-A wireless communications network technology to provide communication between base stations 105.

The communications manager 2220 may support wireless communications at a network repository function in accordance with examples as disclosed herein. For example, the communications manager 2220 may be configured as or otherwise support a means for receiving, from an access and mobility management function, a set of radio access network profiles for a set of radio access network entities. The communications manager 2220 may be configured as or otherwise support a means for registering the set of radio access network profiles at the network repository function. The communications manager 2220 may be configured as or otherwise support a means for receiving, from a network data analytics function, a query for information identifying one or more radio access network entities associated with one or more target devices for analytics processing. The communications manager 2220 may be configured as or otherwise support a means for identifying, in response to the query, one or more radio access network entities of the set of radio access network entities based on the one or more target devices, the set of radio access network profiles, or any combination thereof. The communications manager 2220 may be configured as or otherwise support a means for transmitting, to the network data analytics function, a response to the query including an indication of the identified one or more radio access network entities.

By including or configuring the communications manager 2220 in accordance with examples as described herein, the device 2205 may support techniques for improved communication reliability, reduced latency, improved user experience related to reduced processing, reduced power consumption, more efficient utilization of communication resources, improved coordination between devices, longer battery life, improved utilization of processing capability, or a combination thereof.

In some examples, the communications manager 2220 may be configured to perform various operations (e.g., receiving, monitoring, transmitting) using or otherwise in cooperation with the transceiver 2215, the one or more antennas 2225, or any combination thereof. Although the communications manager 2220 is illustrated as a separate component, in some examples, one or more functions described with reference to the communications manager 2220 may be supported by or performed by the processor 2240, the memory 2230, the code 2235, or any combination thereof. For example, the code 2235 may include instructions executable by the processor 2240 to cause the device 2205 to perform various aspects of RAN node registration and discovery as described herein, or the processor 2240 and the memory 2230 may be otherwise configured to perform or support such operations.

FIG. 23 shows a flowchart illustrating a method 2300 that supports RAN node registration and discovery in accordance with aspects of the present disclosure. The operations of the method 2300 may be implemented by an AMF or its components as described herein. For example, the operations of the method 2300 may be performed by an AMF as described with reference to FIGS. 1 through 10. In some examples, an AMF may execute a set of instructions to control the functional elements of the AMF to perform the described functions. Additionally or alternatively, the AMF may perform aspects of the described functions using special-purpose hardware.

At 2305, the method may include receiving a network entity setup request from a radio access network entity. The operations of 2305 may be performed in accordance with examples as disclosed herein. In some examples, aspects of the operations of 2305 may be performed by a setup request reception component 925 as described with reference to FIG. 9.

At 2310, the method may include transmitting, to the radio access network entity and based on the network entity setup request, a setup response including a radio access network profile for the radio access network entity. The operations of 2310 may be performed in accordance with examples as disclosed herein. In some examples, aspects of the operations of 2310 may be performed by a setup response transmission component 930 as described with reference to FIG. 9.

At 2315, the method may include transmitting, to a network repository function and based on the network entity setup request, a radio access network registration message including the radio access network profile for the radio access network entity. The operations of 2315 may be performed in accordance with examples as disclosed herein. In some examples, aspects of the operations of 2315 may be performed by a RAN registration transmission component 935 as described with reference to FIG. 9.

FIG. 24 shows a flowchart illustrating a method 2400 that supports RAN node registration and discovery in accordance with aspects of the present disclosure. The operations of the method 2400 may be implemented by an NWDAF or its components as described herein. For example, the operations of the method 2400 may be performed by an NWDAF as described with reference to FIGS. 1 through 6 and 11 through 14. In some examples, an NWDAF may execute a set of instructions to control the functional elements of the NWDAF to perform the described functions. Additionally or alternatively, the NWDAF may perform aspects of the described functions using special-purpose hardware.

At 2405, the method may include receiving an analytics request from a device, the analytics request including an indication of one or more target devices for analytics processing. The operations of 2405 may be performed in accordance with examples as disclosed herein. In some examples, aspects of the operations of 2405 may be performed by an analytics request reception component 1325 as described with reference to FIG. 13.

At 2410, the method may include transmitting a query based on the analytics request, the query including a request for information identifying one or more radio access network entities associated with the one or more target devices. The operations of 2410 may be performed in accordance with examples as disclosed herein. In some examples, aspects of the operations of 2410 may be performed by an information query transmission component 1330 as described with reference to FIG. 13.

At 2415, the method may include receiving a response to the query including the information identifying the one or more radio access network entities associated with the one or more target devices. The operations of 2415 may be performed in accordance with examples as disclosed herein. In some examples, aspects of the operations of 2415 may be performed by an information query response reception component 1335 as described with reference to FIG. 13.

At 2420, the method may include transmitting a data collection request to a radio access network entity based on the response to the query, the one or more radio access network entities including at least the radio access network entity. The operations of 2420 may be performed in accordance with examples as disclosed herein. In some examples, aspects of the operations of 2420 may be performed by a data collection request transmission component 1340 as described with reference to FIG. 13.

At 2425, the method may include receiving, from the radio access network entity in response to the data collection request, a data collection response including analytics information associated with the one or more target devices. The operations of 2425 may be performed in accordance with examples as disclosed herein. In some examples, aspects of the operations of 2425 may be performed by a data collection response reception component 1345 as described with reference to FIG. 13.

FIG. 25 shows a flowchart illustrating a method 2500 that supports RAN node registration and discovery in accordance with aspects of the present disclosure. The operations of the method 2500 may be implemented by a UDM or its components as described herein. For example, the operations of the method 2500 may be performed by a UDM as described with reference to FIGS. 1 through 6 and 15 through 18. In some examples, a UDM may execute a set of instructions to control the functional elements of the UDM to perform the described functions. Additionally or alternatively, the UDM may perform aspects of the described functions using special-purpose hardware.

At 2505, the method may include receiving, from an access and mobility management function, radio access network information associated with a set of radio access network entities. The operations of 2505 may be performed in accordance with examples as disclosed herein. In some examples, aspects of the operations of 2505 may be performed by a RAN information reception component 1725 as described with reference to FIG. 17.

At 2510, the method may include storing, at the unified data management function, the radio access network information associated with the set of radio access network entities. The operations of 2510 may be performed in accordance with examples as disclosed herein. In some examples, aspects of the operations of 2510 may be performed by a RAN information storage component 1730 as described with reference to FIG. 17.

At 2515, the method may include receiving, from a network data analytics function, a query for information associated with one or more target devices for analytics processing. The operations of 2515 may be performed in accordance with examples as disclosed herein. In some examples, aspects of the operations of 2515 may be performed by an analytics information query reception component 1735 as described with reference to FIG. 17.

At 2520, the method may include identifying, in response to the query, one or more radio access network entities of the set of radio access network entities based on the one or more target devices, the stored radio access network information, or any combination thereof. The operations of 2520 may be performed in accordance with examples as disclosed herein. In some examples, aspects of the operations of 2520 may be performed by a RAN entity identification component 1740 as described with reference to FIG. 17.

At 2525, the method may include transmitting, to the network data analytics function, a response to the query including an indication of the identified one or more radio access network entities. The operations of 2525 may be performed in accordance with examples as disclosed herein. In some examples, aspects of the operations of 2525 may be performed by an analytics information response transmission component 1745 as described with reference to FIG. 17.

Figure 26:
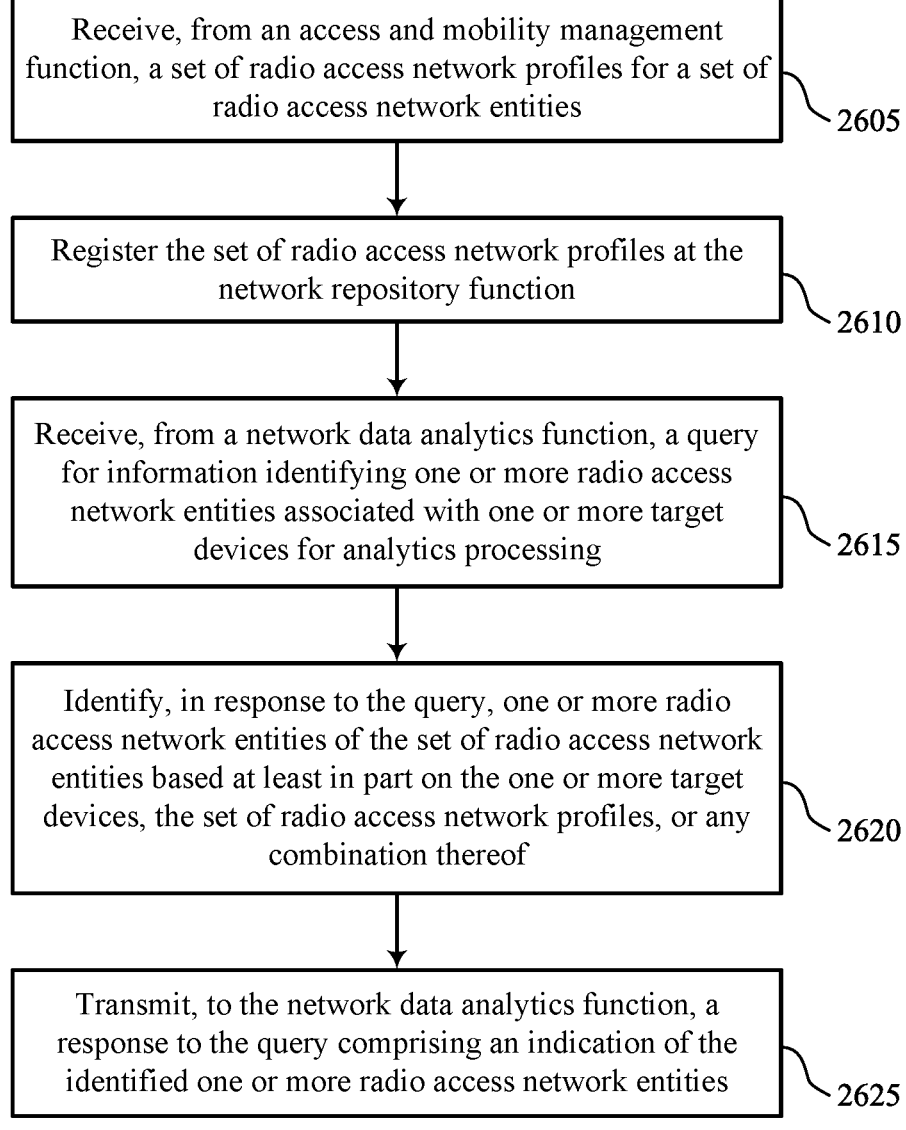

FIG. 26 shows a flowchart illustrating a method 2600 that supports RAN node registration and discovery in accordance with aspects of the present disclosure. The operations of the method 2600 may be implemented by an NRF or its components as described herein. For example, the operations of the method 2600 may be performed by an NRF as described with reference to FIGS. 1 through 6 and 19 through 22. In some examples, an NRF may execute a set of instructions to control the functional elements of the NRF to perform the described functions. Additionally or alternatively, the NRF may perform aspects of the described functions using special-purpose hardware.

At 2605, the method may include receiving, from an access and mobility management function, a set of radio access network profiles for a set of radio access network entities. The operations of 2605 may be performed in accordance with examples as disclosed herein. In some examples, aspects of the operations of 2605 may be performed by a RAN profile reception component 2125 as described with reference to FIG. 21.

At 2610, the method may include registering the set of radio access network profiles at the network repository function. The operations of 2610 may be performed in accordance with examples as disclosed herein. In some examples, aspects of the operations of 2610 may be performed by a RAN profile registration component 2130 as described with reference to FIG. 21.

At 2615, the method may include receiving, from a network data analytics function, a query for information identifying one or more radio access network entities associated with one or more target devices for analytics processing. The operations of 2615 may be performed in accordance with examples as disclosed herein. In some examples, aspects of the operations of 2615 may be performed by an analytics information query reception component 2135 as described with reference to FIG. 21.

At 2620, the method may include identifying, in response to the query, one or more radio access network entities of the set of radio access network entities based on the one or more target devices, the set of radio access network profiles, or any combination thereof. The operations of 2620 may be performed in accordance with examples as disclosed herein.

In some examples, aspects of the operations of 2620 may be performed by a RAN entity identification component 2140 as described with reference to FIG. 21.

At 2625, the method may include transmitting, to the network data analytics function, a response to the query including an indication of the identified one or more radio access network entities. The operations of 2625 may be performed in accordance with examples as disclosed herein. In some examples, aspects of the operations of 2625 may be performed by an analytics information response transmission component 2145 as described with reference to FIG. 21.

The following provides an overview of aspects of the present disclosure:

Aspect 1: A method for wireless communications at an access and mobility management function, comprising: receiving a network entity setup request from a radio access network entity; transmitting, to the radio access network entity and based at least in part on the network entity setup request, a setup response comprising a radio access network profile for the radio access network entity; and transmitting, to a network repository function and based at least in part on the network entity setup request, a radio access network registration message comprising the radio access network profile for the radio access network entity.

Aspect 2: The method of aspect 1, further comprising: transmitting, to a unified data management function and based at least in part on the network entity setup request, radio access network entity information associated with the radio access network entity.

Aspect 3: The method of aspect 2, wherein the radio access network entity information comprises a radio access network entity identifier for the radio access network entity, a radio access network entity name for the radio access network entity, or both.

Aspect 4: The method of any of aspects 1 through 3, further comprising: receiving, from the radio access network entity, a request to update the radio access network profile for the radio access network entity; transmitting, to the network repository function, an updated radio access network profile for the radio access network entity; and receiving a confirmation message from the network repository function indicating that that the updated radio access network profile for the radio access network entity has been registered at the network repository function.

Aspect 5: The method of aspect 4, wherein the updated radio access network profile comprises an updated radio access network entity identifier for the radio access network entity, an updated radio access network entity name for the radio access network entity, or both.

Aspect 6: The method of any of aspects 1 through 5, wherein the radio access network profile comprises a radio access network entity identifier for the radio access network entity, a radio access network entity name for the radio access network entity, one or more registration areas supported by the radio access network entity, registration area code slice information for the radio access network entity, or any combination thereof.

Aspect 7: The method of any of aspects 1 through 6, further comprising: receiving a confirmation message from the network repository function indicating that the radio access network profile for the radio access network entity has been registered at the network repository function.

Aspect 8: A method for wireless communications at a network data analytics function, comprising: receiving an analytics request from a device, the analytics request comprising an indication of one or more target devices for analytics processing; transmitting a query based at least in part on the analytics request, the query comprising a request for information identifying one or more radio access network entities associated with the one or more target devices; receiving a response to the query comprising the information identifying the one or more radio access network entities associated with the one or more target devices; transmitting a data collection request to a radio access network entity based at least in part on the response to the query, the one or more radio access network entities comprising at least the radio access network entity; and receiving, from the radio access network entity in respective to the data collection request, a data collection response comprising analytics information associated with the one or more target devices.

Aspect 9: The method of aspect 8, wherein transmitting the query comprises transmitting the query to a network repository function.

Aspect 10: The method of aspect 9, wherein the indication of one or more target devices comprises an indication of one or more registration areas, an indication of one or more network slices, or both; and the request for information associated with the one or more target devices comprises a request for information associated with the one or more registration areas, the one or more network slices, or both.

Aspect 11: The method of any of aspects 8 through 10, further comprising: transmitting the query comprises transmitting the query to a unified data management function.

Aspect 12: The method of aspect 11, wherein the indication of one or more target devices comprises an indication of one or more network subscription identifiers, one or more identifiers for one or more groups of target devices, one or more user equipments (UEs), or any combination thereof; and the request for information associated with the one or more target devices comprises a request for information associated with the one or more network subscription identifiers, the one or more identifiers for the one or more groups of target devices, the one or more UEs, or any combination thereof.

Aspect 13: The method of aspect 12, wherein the information identifying the one or more radio access network entities comprises information identifying a radio access network entity that is associated with one of the one or more UEs.

Aspect 14: The method of any of aspects 8 through 13, wherein the information identifying the one or more radio access network entities comprises a list of one or more radio access network entity identifiers.

Aspect 15: The method of any of aspects 8 through 14, wherein the device comprises an access and mobility management function, a service management function, a policy control function, a second radio access network entity, a core network entity, an application function, an operations, administration and maintenance function, or any combination thereof.

Aspect 16: The method of any of aspects 8 through 15, further comprising: transmitting, to the device and in response to receiving the analytics request, an analytics response comprising the analytics information associated with the one or more target devices.

Aspect 17: The method of aspect 16, further comprising: determining one or more analytics results based at least in part on the analytics information, wherein the analytics response further comprises the one or more analytics results.

Aspect 18: A method for wireless communications at a unified data management function, comprising: receiving, from an access and mobility management function, radio access network information associated with a set of radio access network entities; storing, at the unified data management function, the radio access network information associated with the set of radio access network entities; receiving, from a network data analytics function, a query for information associated with one or more target devices for analytics processing; identifying, in response to the query, one or more radio access network entities of the set of radio access network entities based at least in part on the one or more target devices, the stored radio access network information, or any combination thereof; and transmitting, to the network data analytics function, a response to the query comprising an indication of the identified one or more radio access network entities.

Aspect 19: The method of aspect 18, wherein the radio access network information comprises a radio access network entity identifier, a radio access network entity name, or both.

Aspect 20: The method of any of aspects 18 through 19, wherein the radio access network information is received as part of a registration area update procedure.

Aspect 21: The method of any of aspects 18 through 20, wherein the query further comprises a request for information associated with one or more network subscription identifiers, one or more identifiers for one or more groups of target devices, one or more user equipments (UEs) or any combination thereof; and identifying the one or more radio access network entities of the set of radio access network entities is based at least in part on the one or more network subscription identifiers, the one or more identifiers for the one or more groups of target devices, the one or more UEs, or any combination thereof.

Aspect 22: The method of any of aspects 18 through 21, wherein the indication of the identified one or more radio access network entities comprises a radio access network entity identifier associated with a radio access network entity that is associated with one of the one or more UEs.

Aspect 23: The method of any of aspects 18 through 22, wherein the indication of the identified one or more radio access network entities comprises a list of one or more radio access network entity identifiers.

Aspect 24: A method for wireless communications at a network repository function, comprising: receiving, from an access and mobility management function, a set of radio access network profiles for a set of radio access network entities; registering the set of radio access network profiles at the network repository function; receiving, from a network data analytics function, a query for information identifying one or more radio access network entities associated with one or more target devices for analytics processing; identifying, in response to the query, one or more radio access network entities of the set of radio access network entities based at least in part on the one or more target devices, the set of radio access network profiles, or any combination thereof; and transmitting, to the network data analytics function, a response to the query comprising an indication of the identified one or more radio access network entities.

Aspect 25: The method of aspect 24, further comprising: receiving an updated radio access network profile comprising an update flag; and updating a radio access network profile of the set of radio access network profiles based at least in part on the updated radio access network profile; and transmitting a confirmation message indicating that the radio access network profile of the set of radio access network profiles has been updated.

Aspect 26: The method of aspect 25, wherein the updated radio access network profile comprises a radio access network entity identifier, a radio access network entity name, or both.

Aspect 27: The method of any of aspects 24 through 26, wherein each radio access network profile of the set of radio access network profiles comprises a radio access network entity identifier, a radio access network entity name, one or more supported registration areas, network slicing information, or any combination thereof.

Aspect 28: The method of any of aspects 24 through 27, further comprising: transmitting, to the access and mobility management function, a confirmation message indicating that the set of radio access network profiles has been registered at the network repository function.

Aspect 29: The method of any of aspects 24 through 28, wherein the query further comprises a request for information associated with one or more registration areas, one or more network slices, or both; and identifying the one or more radio access network entities is based at least in part on the one or more registration areas, the one or more network slices, or both.

Aspect 30: The method of any of aspects 24 through 29, wherein the indication of the identified one or more radio access network entities comprises a list of one or more radio access network entity identifiers.

Aspect 31: An apparatus for wireless communications at an access and mobility management function, comprising a processor; memory coupled with the processor; and instructions stored in the memory and executable by the processor to cause the apparatus to perform a method of any of aspects 1 through 7.

Aspect 32: An apparatus for wireless communications at an access and mobility management function, comprising at least one means for performing a method of any of aspects 1 through 7.

Aspect 33: A non-transitory computer-readable medium storing code for wireless communications at an access and mobility management function, the code comprising instructions executable by a processor to perform a method of any of aspects 1 through 7.

Aspect 34: An apparatus for wireless communications at a network data analytics function, comprising a processor; memory coupled with the processor; and instructions stored in the memory and executable by the processor to cause the apparatus to perform a method of any of aspects 8 through 17.

Aspect 35: An apparatus for wireless communications at a network data analytics function, comprising at least one means for performing a method of any of aspects 8 through 17.

Aspect 36: A non-transitory computer-readable medium storing code for wireless communications at a network data analytics function, the code comprising instructions executable by a processor to perform a method of any of aspects 8 through 17.

Aspect 37: An apparatus for wireless communications at a unified data management function, comprising a processor; memory coupled with the processor; and instructions stored in the memory and executable by the processor to cause the apparatus to perform a method of any of aspects 18 through 23.

Aspect 38: An apparatus for wireless communications at a unified data management function, comprising at least one means for performing a method of any of aspects 18 through 23.

Aspect 39: A non-transitory computer-readable medium storing code for wireless communications at a unified data management function, the code comprising instructions executable by a processor to perform a method of any of aspects 18 through 23.

Aspect 40: An apparatus for wireless communications at a network repository function, comprising a processor; memory coupled with the processor; and instructions stored in the memory and executable by the processor to cause the apparatus to perform a method of any of aspects 24 through 30.

Aspect 41: An apparatus for wireless communications at a network repository function, comprising at least one means for performing a method of any of aspects 24 through 30.

Aspect 42: A non-transitory computer-readable medium storing code for wireless communications at a network repository function, the code comprising instructions executable by a processor to perform a method of any of aspects 24 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a network data analytics function, comprising:
  one or more memories;
  one or more processors coupled with the one or more processors; and
  instructions stored in the one or more memories and executable by the one or more processors to cause the apparatus to:
    receive an analytics request from a device, the analytics request comprising an indication of one or more target devices for analytics processing;
    transmit a query corresponding to the analytics request, the query comprising a request for information identifying one or more radio access network entities associated with the one or more target devices;
    receive a response to the query comprising the information identifying the one or more radio access network entities associated with the one or more target devices;
    transmit a data collection request to a radio access network entity corresponding to the response to the query, the one or more radio access network entities comprising at least the radio access network entity; and
    receive, from the radio access network entity in response to the data collection request, a data collection response comprising analytics information associated with the one or more target devices.

2. The apparatus of claim 1, wherein the instructions are executable by the one or more processors to cause the apparatus to transmit the query to a network repository function.

3. The apparatus of claim 2, wherein:
  the indication of the one or more target devices comprises an indication of one or more registration areas, an indication of one or more network slices, or both; and
  the request for information associated with the one or more target devices comprises a request for information associated with the one or more registration areas, the one or more network slices, or both.

4. The apparatus of claim 1, wherein the instructions are executable by the one or more processors to cause the apparatus to transmit the query to a unified data management function.

5. The apparatus of claim 4, wherein:
  the indication of the one or more target devices comprises an indication of one or more network subscription identifiers, one or more identifiers for one or more groups of target devices, one or more user equipments (UEs), or any combination thereof; and
  the request for information associated with the one or more target devices comprises a request for information associated with the one or more network subscription identifiers, the one or more identifiers for the one or more groups of target devices, the one or more UEs, or any combination thereof.

6. The apparatus of claim 5, wherein the information identifying the one or more radio access network entities comprises information identifying a radio access network entity that is associated with one of the one or more UEs.

7. The apparatus of claim 1, wherein the information identifying the one or more radio access network entities comprises a list of one or more radio access network entity identifiers.

8. The apparatus of claim 1, wherein the device comprises an access and mobility management function, a service management function, a policy control function, a second radio access network entity, a core network entity, an application function, an operations, administration and maintenance function, or any combination thereof.

9. The apparatus of claim 1, wherein the instructions are further executable by the one or more processors to cause the apparatus to:
  transmit, to the device and in response to receiving the analytics request, an analytics response comprising the analytics information associated with the one or more target devices.

10. The apparatus of claim 9, wherein the instructions are further executable by the one or more processors to cause the apparatus to:
  determine one or more analytics results corresponding to the analytics information, wherein the analytics response further comprises the one or more analytics results.

11. An apparatus for wireless communications at a unified data management function, comprising:
  one or more processors;
  one or more memories coupled with the one or more processors; and
  instructions stored in the one or more memories and executable by the one or more processors to cause the apparatus to:
    receive, from an access and mobility management function, radio access network information associated with a set of radio access network entities;
    store, at the unified data management function, the radio access network information associated with the set of radio access network entities;
    receive, from a network data analytics function, a query for information associated with one or more target devices for analytics processing;
    identify, in response to the query, one or more radio access network entities of the set of radio access network entities corresponding to the one or more target devices, the stored radio access network information, or both; and transmit, to the network data analytics function, a response to the query comprising an indication of the identified one or more radio access network entities.

12. The apparatus of claim 11, wherein the radio access network information comprises a radio access network entity identifier, a radio access network entity name, or both.

13. The apparatus of claim 11, wherein the radio access network information is received as part of a registration area update procedure.

14. The apparatus of claim 11, wherein:

the query further comprises a request for information associated with one or more network subscription identifiers, one or more identifiers for one or more groups of target devices, one or more user equipments (UEs) or any combination thereof; and the instructions are executable by the one or more processors to cause the apparatus to identify the one or more radio access network entities of the set of radio access network entities corresponding to the one or more network subscription identifiers, the one or more identifiers for the one or more groups of target devices, the one or more UEs, or any combination thereof.

15. The apparatus of claim 11, wherein the indication of the identified one or more radio access network entities comprises a radio access network entity identifier associated with a radio access network entity that is associated with a user equipment (UE) of one or more UEs.

16. The apparatus of claim 11, wherein the indication of the identified one or more radio access network entities comprises a list of one or more radio access network entity identifiers.

17. An apparatus for wireless communications at a network repository function, comprising:

one or more processors;

one or more memories coupled with the one or more processors; and instructions stored in the one or more memories and executable by the one or more processors to cause the apparatus to:

receive, from an access and mobility management function, a set of radio access network profiles for a set of radio access network entities;

register the set of radio access network profiles at the network repository function;

receive, from a network data analytics function, a query for information identifying one or more radio access network entities associated with one or more target devices for analytics processing;

identify, in response to the query, the one or more radio access network entities of the set of radio access network entities corresponding to the one or more target devices, the set of radio access network profiles, or any combination thereof; and transmit, to the network data analytics function, a response to the query comprising an indication of the identified one or more radio access network entities.

18. The apparatus of claim 17, wherein the instructions are further executable by the one or more processors to cause the apparatus to:

receive an updated radio access network profile comprising an update flag;

update a radio access network profile of the set of radio access network profiles in accordance with the updated radio access network profile; and transmit a confirmation message indicating that the radio access network profile of the set of radio access network profiles has been updated.

19. The apparatus of claim 18, wherein the updated radio access network profile comprises a radio access network entity identifier, a radio access network entity name, or both.

20. The apparatus of claim 17, wherein each radio access network profile of the set of radio access network profiles comprises a radio access network entity identifier, a radio access network entity name, one or more supported registration areas, network slicing information, or any combination thereof.

21. The apparatus of claim 17, wherein the instructions are further executable by the one or more processors to cause the apparatus to:

transmit, to the access and mobility management function, a confirmation message indicating that the set of radio access network profiles has been registered at the network repository function.

22. The apparatus of claim 17, wherein:

the query further comprises a request for information associated with one or more registration areas, one or more network slices, or both; and the instructions are executable by the one or more processors to cause the apparatus to identify the one or more radio access network entities in accordance with the one or more registration areas, the one or more network slices, or both.

23. The apparatus of claim 17, wherein the indication of the identified one or more radio access network entities comprises a list of one or more radio access network entity identifiers.

24. A method for wireless communications at a network data analytics function, comprising:

receiving an analytics request from a device, the analytics request comprising an indication of one or more target devices for analytics processing;

transmitting a query corresponding to the analytics request, the query comprising a request for information identifying one or more radio access network entities associated with the one or more target devices;

receiving a response to the query comprising the information identifying the one or more radio access network entities associated with the one or more target devices;

transmitting a data collection request to a radio access network entity corresponding to the response to the query, the one or more radio access network entities comprising at least the radio access network entity; and receive, from the radio access network entity in response to the data collection request, a data collection response comprising analytics information associated with the one or more target devices.

25. The method of claim 24, further comprising:

transmitting the query to a network repository function.

26. The method of claim 25, wherein:

the indication of the one or more target devices comprises an indication of one or more registration areas, an indication of one or more network slices, or both; and the request for information associated with the one or more target devices comprises a request for information associated with the one or more registration areas, the one or more network slices, or both.

27. The method of claim 24, further comprising:

transmitting the query to a unified data management function.

28. The method of claim 27, wherein:

the indication of the one or more target devices comprises an indication of one or more network subscription identifiers, one or more identifiers for one or more groups of target devices, one or more user equipments (UEs), or any combination thereof; and the request for information associated with the one or more target devices comprises a request for information associated with the one or more network subscription identifiers, the one or more identifiers for the one or more groups of target devices, the one or more UEs, or any combination thereof.

29. The method of claim 28, wherein the information identifying the one or more radio access network entities comprises information identifying a radio access network entity that is associated with one of the one or more UEs.

30. The method of claim 24, wherein the information identifying the one or more radio access network entities comprises a list of one or more radio access network entity identifiers.

\* \* \* \* \*